(12) United States Patent
Takada

(10) Patent No.: US 11,840,048 B2
(45) Date of Patent: Dec. 12, 2023

(54) LAMINATED BODY AND METHOD FOR MANUFACTURING LAMINATED BODY

(71) Applicant: AGC Inc., Tokyo (JP)

(72) Inventor: Kosuke Takada, Tokyo (JP)

(73) Assignee: AGC Inc., Tokyo (JP)

( * ) Notice: Subject to any disclaimer, the term of this patent is extended or adjusted under 35 U.S.C. 154(b) by 0 days.

(21) Appl. No.: 17/932,803

(22) Filed: Sep. 16, 2022

(65) Prior Publication Data

US 2023/0095868 A1 Mar. 30, 2023

(30) Foreign Application Priority Data

Sep. 24, 2021 (JP) .................................. 2021-155672

(51) Int. Cl.
*B32B 17/10* (2006.01)
*B32B 7/12* (2006.01)
*B32B 37/12* (2006.01)

(52) U.S. Cl.
CPC .......... *B32B 17/10018* (2013.01); *B32B 7/12* (2013.01); *B32B 17/10779* (2013.01); *B32B 17/10798* (2013.01); *B32B 2037/1223* (2013.01); *B32B 2250/03* (2013.01); *B32B 2309/02* (2013.01); *B32B 2309/105* (2013.01)

(58) Field of Classification Search
CPC .............. B32B 17/10018; B32B 17/12; B32B 17/10798; B32B 17/10779; B32B 2307/1223; B32B 2250/03; B32B 2250/02; B32B 2309/105

USPC ........................................................ 428/429
See application file for complete search history.

(56) References Cited

U.S. PATENT DOCUMENTS

2015/0175850 A1 6/2015 Michaud

FOREIGN PATENT DOCUMENTS

| JP | 2004-82530 A | 3/2004 | |
|---|---|---|---|
| JP | 2005-340594 A | 12/2005 | |
| JP | 2010-265416 A | 11/2010 | |
| JP | 2014-150221 A | 8/2014 | |
| JP | 2016-83926 A | 5/2016 | |
| JP | 2017-185807 A | 10/2017 | |
| JP | 2018-108677 A | 7/2018 | |
| JP | 2018-128655 A | 8/2018 | |
| JP | 2019-508522 A | 3/2019 | |
| JP | 2020-76069 A | 5/2020 | |
| JP | 2021-062571 A | 4/2021 | |
| WO | WO-2018034290 A1 * | 2/2018 | ....... B32B 17/10165 |
| WO | WO-2022230892 A1 * | 11/2022 | |

* cited by examiner

*Primary Examiner* — Michael M. Bernshteyn
(74) *Attorney, Agent, or Firm* — Oblon, McClelland, Maier & Neustadt, L.L.P.

(57) ABSTRACT

A laminated body includes a glass substrate, an adhesion layer, and a resin layer in this order. The adhesion layer includes a side-contact portion. The side-contact portion is located outside an outer edge of the resin layer in a part of an entire circumferential of the outer edge when observing the laminated body from a normal direction of a surface of the glass substrate, and is in contact with at least a part of a side surface of the resin layer.

7 Claims, 8 Drawing Sheets

LAMINATED BODY AND METHOD FOR MANUFACTURING LAMINATED BODY

CROSS-REFERENCE TO RELATED APPLICATIONS

This application claims priority from Japanese Patent Application No. 2021-155672 filed on Sep. 24, 2021, the entire subject matter of which is incorporated herein by reference.

TECHNICAL FIELD

The present invention relates to a laminated body and a method for manufacturing a laminated body.

BACKGROUND ART

A polyimide resin layer is used as a substrate when manufacturing an electronic device such as a solar cell, a liquid crystal panel (LCD), an organic EL display device (OLED), or a reception sensor panel that senses electromagnetic waves, X-rays, ultraviolet rays, visible light, infrared rays, or the like. The polyimide resin layer is used in a state of a laminated body provided on a glass substrate, and the laminated body is provided for manufacturing an electronic device. After the electronic device is formed, the polyimide resin layer and the glass substrate are separated from each other.

The polyimide resin layer and the glass substrate are separated from each other by using a laser beam, for example, as disclosed in Patent Literature 1.

CITATION LIST

Patent Literature

Patent Literature 1: JP-A-2017-185807

SUMMARY OF INVENTION

Technical Problem

As described above, the laser beam is used to separate the polyimide resin layer and the glass substrate. However, the present inventors have found a method in which a polyimide varnish is applied onto an adhesion layer to prepare a polyimide substrate, and the polyimide substrate is peeled off by a physical force.

As a method of forming the adhesion layer described above, an adhesion layer is formed on a resin layer serving as a protective layer, and the adhesion layer is laminated to a glass substrate to manufacture a glass substrate with an adhesion layer, that is, a laminated body. The resin layer of the laminated body is peeled off, and, for example, a polyimide varnish is applied onto the adhesion layer to form a polyimide resin layer.

There is a problem in handleability of a laminated body in which a resin layer as a protective layer is laminated on an adhesion layer used for forming a polyimide resin layer. Before the polyimide resin layer is formed, it is desired that the protective layer is not easily peeled off during transportation or the like, and is easily peeled off when peeling off the protective layer at the time of forming the polyimide resin layer.

An object of the present invention is to provide a laminated body and a method for manufacturing a laminated body, in which a resin layer is not easily peeled off during handling and the resin layer can be peeled off during a treatment of peeling off the resin layer.

Solution to Problem

As a result of intensive studies, the present inventors have found that the above-described object can be achieved by the following configuration.

An aspect of the present invention is a laminated body including a glass substrate, an adhesion layer, and a resin layer in this order, in which the adhesion layer includes a side-contact portion that is located outside an outer edge of the resin layer in a part of an entire circumferential of the outer edge when observing the laminated body from a normal direction of a surface of the glass substrate, the side-contact portion being in contact with at least a part of a side surface of the resin layer.

The adhesion layer preferably has a side-contact portion that is located outside the outer edge in a range of 25% to 99% of the entire circumferential of the outer edge of the resin layer.

The resin layer has a quadrangular shape, and the side-contact portion is preferably provided at a maximum of three corner portions among four corner portions of the resin layer.

The side-contact portion is preferably in contact with a region of 70% or less of a length of the side surface of the resin layer in a thickness direction.

The side-contact portion is preferably provided continuously along the outer edge of the resin layer or at an interval along the outer edge of the resin layer.

An aspect of the present invention is a method for manufacturing a laminated body. The method includes: a step 1 of laminating an adhesion layer-attached resin layer which has a resin layer and an adhesion layer to a glass substrate so that the adhesion layer and the glass substrate face each other; and a step 2 of performing a heat treatment on the laminated substrate obtained in step 1 at a temperature equal to or higher than a softening point of the adhesion layer.

In step 2 of performing the heat treatment at a temperature equal to or higher than the softening point of the adhesion layer, an outer edge of the resin layer is separated into a region to be heated to a temperature equal to or higher than the softening point of the adhesion layer and a region to be heated to a temperature lower than the softening point of the adhesion layer when observing the laminated substrate from a normal direction of a surface of the glass substrate, and the heat treatment is performed.

Step 2 of performing the heat treatment at a temperature equal to or higher than the softening point of the adhesion layer includes a disposing step of disposing the laminated substrate on a heating plate with at least a part of the outer edge of the resin layer protruding from an edge of the heating plate when observing the laminated substrate from the normal direction of the surface of the glass substrate. After the disposing step, the heat treatment is preferably performed on the laminated substrate by the heating plate at a temperature equal to or higher than the softening point of the adhesion layer.

In step 2 of performing the heat treatment at a temperature equal to or higher than the softening point of the adhesion layer, the outer edge of the resin layer is separated into a region to be heated to a temperature equal to or higher than the softening point of the adhesion layer and a region to be heated to a temperature lower than the softening point of the adhesion layer when observing the laminated substrate from a normal direction of a surface of the glass substrate, and the heat treatment is preferably performed on the region to be heated to a temperature equal to or higher than the softening point of the adhesion layer by applying hot air or irradiating with light.

Step 2 of performing the heat treatment at a temperature equal to or higher than the softening point of the adhesion layer includes a disposing step of disposing a heat insulating material or a cooling member on an outer edge of the resin layer when observing the laminated substrate from the normal direction of a surface of the glass substrate. After the disposing step, the heat treatment is preferably performed on the laminated substrate at a temperature equal to or higher than the softening point of the adhesion layer.

In the disposing step, the heat insulating material or the cooling member is preferably disposed in a range of 1% to 75% of an entire circumference of the outer edge of the resin layer.

The resin layer has a quadrangular shape, and in the disposing step, the heat insulating material or the cooling member is preferably provided at a maximum of three corner portions among four corner portions of the resin layer.

In the disposing step, the heat insulating material or the cooling member is preferably disposed continuously along the outer edge of the resin layer or at an interval along the outer edge of the resin layer.

Advantageous Effect

According to the present invention, it is possible to provide a laminated body and a method for manufacturing a laminated body, in which a resin layer is not easily peeled off during handling and the resin layer can be peeled off during a treatment of peeling off the resin layer.

DESCRIPTION OF EMBODIMENTS

Hereinafter, an embodiment of the present invention is described with reference to the drawings. The following embodiment is merely an example for explaining the present invention, and the present invention is not limited to the following embodiment. Various modifications and substitutions can be made to the following embodiment without departing from the scope of the present invention.

The numerical range expressed by using "to" means a range including numerical values described before and after "to" as a lower limit value and an upper limit value.

A laminated body of the present invention is characterized in that, in the laminated body including a glass substrate, an adhesion layer, and a resin layer in this order, the adhesion layer includes a side-contact portion that is located outside an outer edge of the resin layer in a part of an entire circumferential of the outer edge when observing the laminated body from a normal direction of a surface of the glass substrate, and that is in contact with at least a part of a side surface of the resin layer.

It has been found that, due to the presence of the side-contact portion having the above-described configuration, the resin layer is not easily peeled off during handling the laminated body even when an adhesion force of an interface between the resin layer and the adhesion layer is weak, and the resin layer can be peeled off during a treatment of peeling off the resin layer. Thereby, a desired effect can be obtained.

Laminated Body

First Example of Laminated Body

Figure 1:
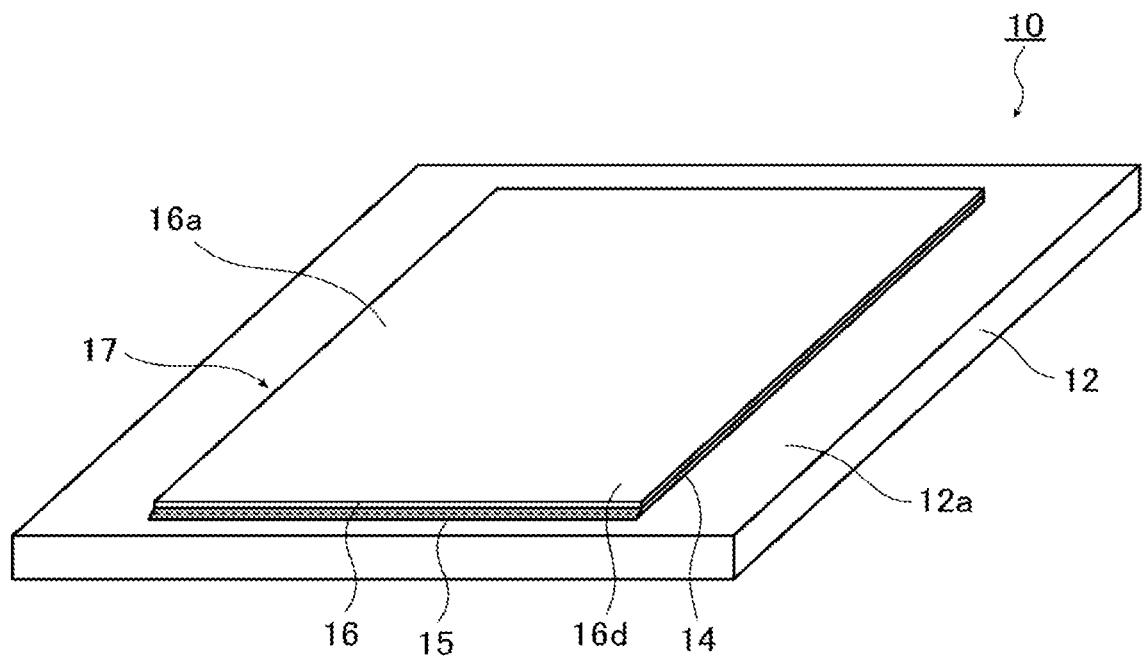
FIG. 1 is a perspective view schematically showing a first example of a laminated body according to an embodiment of the present invention.
Figure 2:
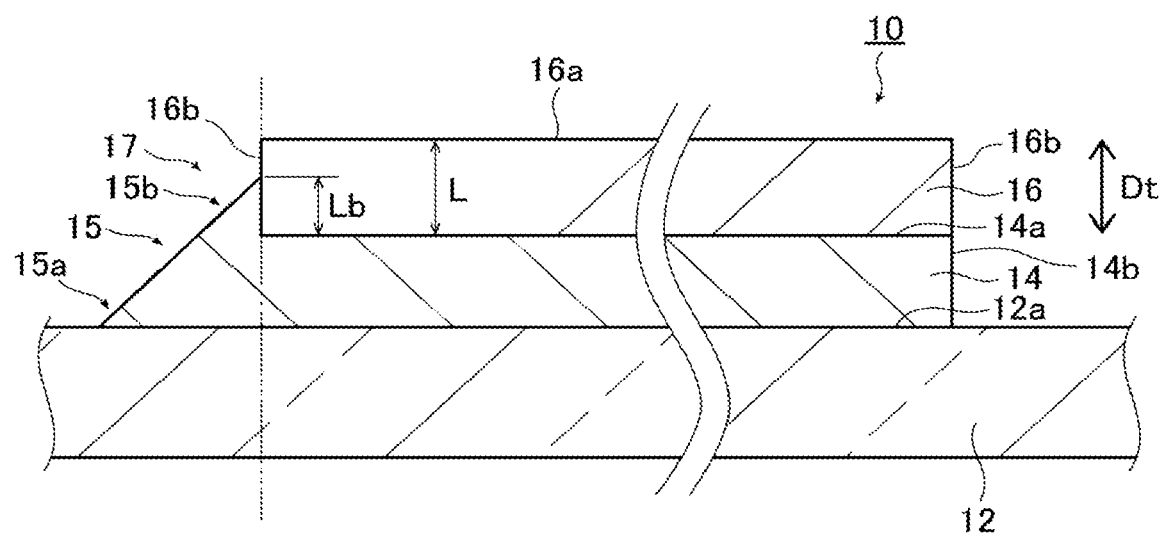
FIG. 2 is a cross-sectional view schematically showing a part of the first example of the laminated body according to the embodiment of the present invention.

FIG. 1 is a perspective view schematically showing a first example of the laminated body according to the embodiment of the present invention. FIG. 2 is a cross-sectional view schematically showing a part of the first example of the laminated body according to the embodiment of the present invention.

A laminated body 10 of the first example shown in FIG. 1 includes a glass substrate 12, an adhesion layer 14, and a resin layer 16 in this order. As shown in FIG. 2, the adhesion layer 14 is disposed on a surface 12a of the glass substrate 12, and the resin layer 16 is disposed on a surface 14a of the adhesion layer 14. As shown in FIG. 1, the glass substrate 12, the adhesion layer 14, and the resin layer 16 have a quadrangular shape in plan view. The glass substrate 12, the adhesion layer 14, and the resin layer 16 are disposed such that sides thereof are parallel to each other. The adhesion layer 14 and the resin layer 16 have substantially the same size, and the glass substrate 12 is larger than the adhesion layer 14 and the resin layer 16.

It should be noted that the plan view is observation from a surface 16a side of the resin layer 16, and has the same meaning as observation of the laminated body 10 from a normal direction of the surface 12a of the glass substrate 12 to be described later.

The adhesion layer 14 has a side-contact portion 15 which is located outside an outer edge 17 of the resin layer 16 in a part of an entire circumference of the outer edge 17 when observing the laminated body 10 from the normal direction of the surface 12a of the glass substrate 12, and which is in contact with at least a part of a side surface 16b (see FIG. 2) of the resin layer 16. For example, in the laminated body 10 shown in FIG. 1, the side-contact portion 15 is provided on one side of the quadrangular resin layer 16.

As shown in FIG. 2, the side-contact portion 15 extends toward an outer edge side of the glass substrate 12 from the side surface 16b of the resin layer 16. The side-contact portion 15 includes an extending portion 15a extending to the surface 12a of the glass substrate 12, and a crawling-up portion 15b crawling up to the surface 16a side of the resin layer 16 on the side surface 16b of the resin layer 16.

The side-contact portion 15 is preferably in contact with a region of 70% or less of a length L of the side surface 16b of the resin layer 16 in a thickness direction Dt. As a result, the resin layer 16 is not easily peeled off when transporting the laminated body 10 or the like, and is easily peeled off when peeling off the resin layer 16.

In the example of FIG. 2, a length Lb is preferably 70% or less of the length L of the resin layer 16 in the thickness direction Dt, where Lb is a length of the crawling-up portion 15b. It is sufficient that the side-contact portion 15 is present, and the lower limit of the length Lb of the crawling-up portion 15b is more than 0% of the length L of the resin layer 16 in the thickness direction Dt.

The side-contact portion 15 is located outside the outer edge 17 of the resin layer 16, and is preferably provided in a range of 25% to 99% of the entire circumference of the outer edge 17 of the resin layer 16, and more preferably provided in a range of 30% to 70% of the entire circumference of the outer edge 17 of the resin layer 16. In the example of FIG. 1, the resin layer 16 has a quadrangular shape, and a total length of four sides of the quadrangular shape is a length of the entire circumference of the outer edge 17 of the resin layer 16.

When the side-contact portion 15 is provided in a range of 25% to 99% of the entire circumference of the outer edge 17 of the resin layer 16, the resin layer 16 is not easily peeled off during handling, and the resin layer 16 can be peeled off when peeling off the resin layer 16.

As shown in FIG. 1, when the resin layer 16 has a quadrangular shape, the side-contact portion 15 is preferably not located at least one of the corner portions of the resin layer 16. Accordingly, the resin layer 16 is easily peeled off when being peeled off. That is, since the side-contact portion 15 is not provided at the corner portion 16d of the resin layer 16, the resin layer 16 is easily peeled off when being peeled off.

As shown in FIG. 2, when a side surface 14b of the adhesion layer 14 and the side surface 16b of the resin layer 16 are flush with each other in the thickness direction Dt, the resin layer 16 is easily peeled off. The state where the side surface 14b of the adhesion layer 14 and the side surface 16b of the resin layer 16 are flush with each other in the thickness direction Dt is a state where the side-contact portion 15 is not present, and is a state where the adhesion layer 14 is not present on the side surface 16b of the resin layer 16 and the side surface contact portion 15 is not present.

Second to Eleventh Examples of Laminated Body

The configuration of the laminated body 10 is not limited to that shown in FIG. 1.

Figure 3:
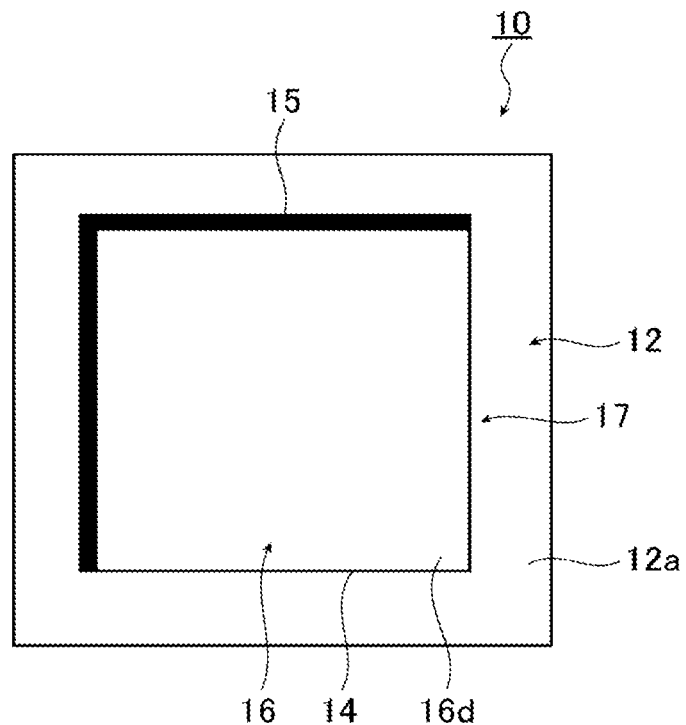
FIG. 3 is a plan view schematically showing a second example of the laminated body according to the embodiment of the present invention.
Figure 4:
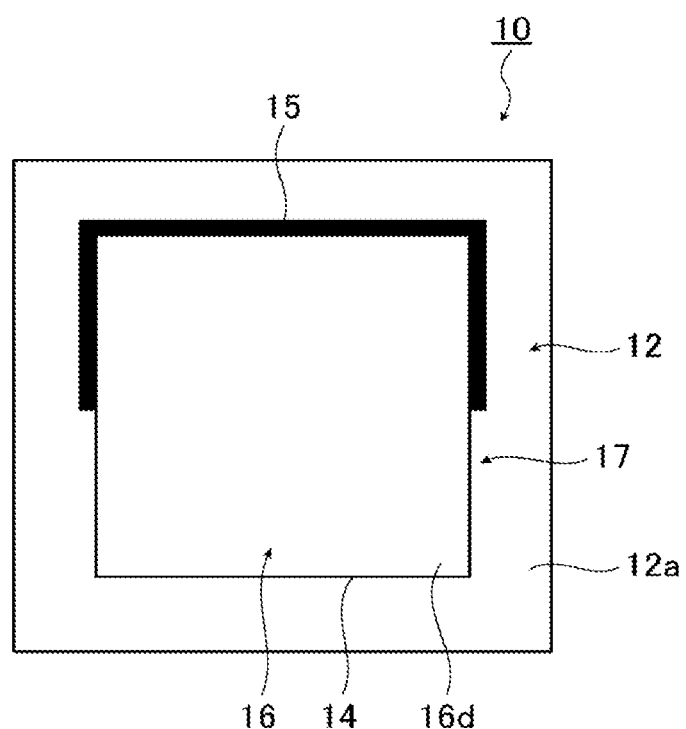
FIG. 4 is a plan view schematically showing a third example of the laminated body according to the embodiment of the present invention.
Figure 5:
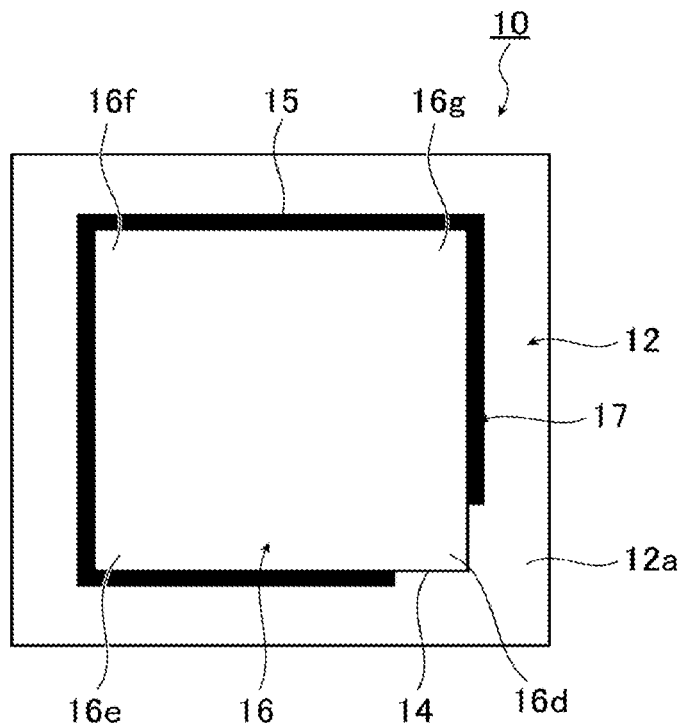
FIG. 5 is a plan view schematically showing a fourth example of the laminated body according to the embodiment of the present invention.
Figure 6:
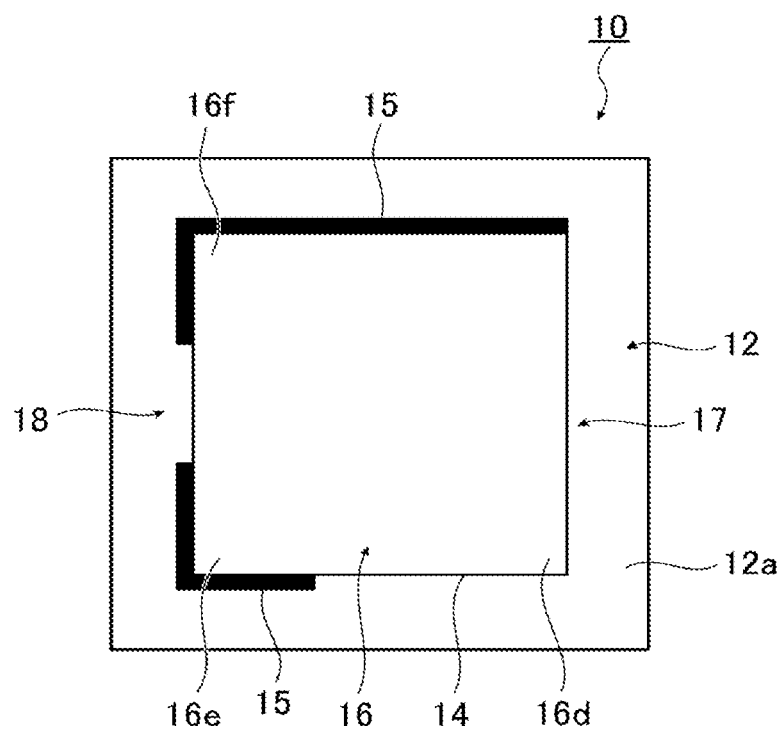
FIG. 6 is a plan view schematically showing a fifth example of the laminated body according to the embodiment of the present invention.
Figure 7:
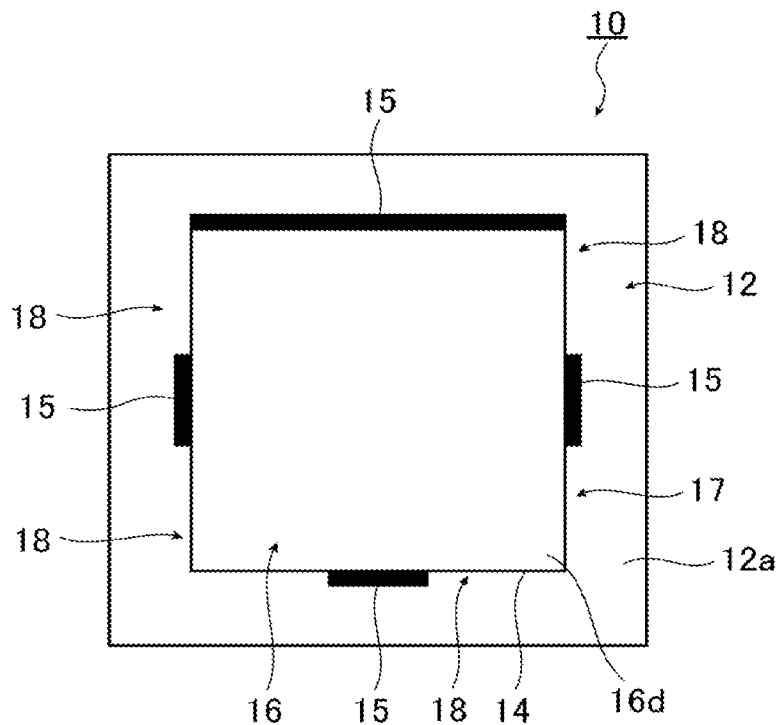
FIG. 7 is a plan view schematically showing a sixth example of the laminated body according to the embodiment of the present invention.
Figure 8:
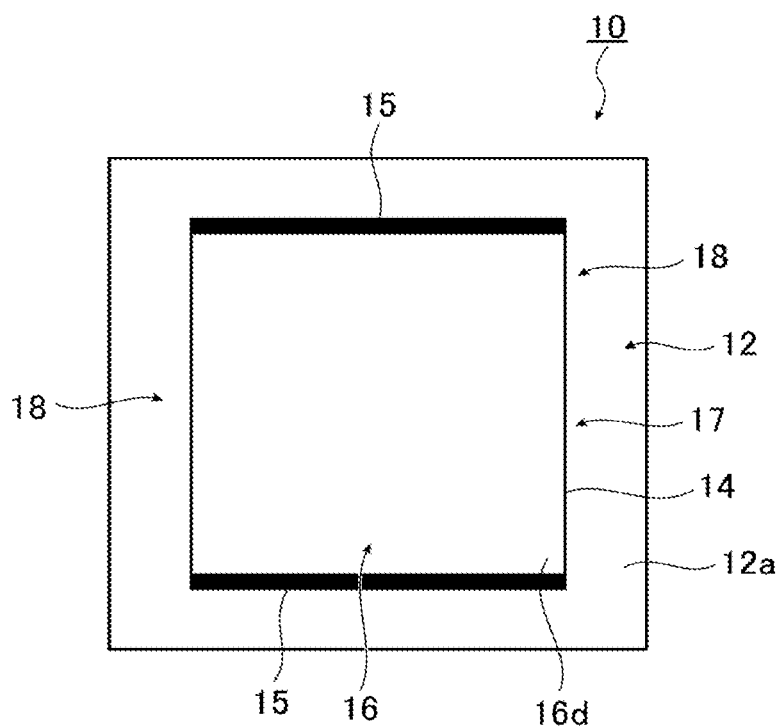
FIG. 8 is a plan view schematically showing a seventh example of the laminated body according to the embodiment of the present invention.
Figure 9:
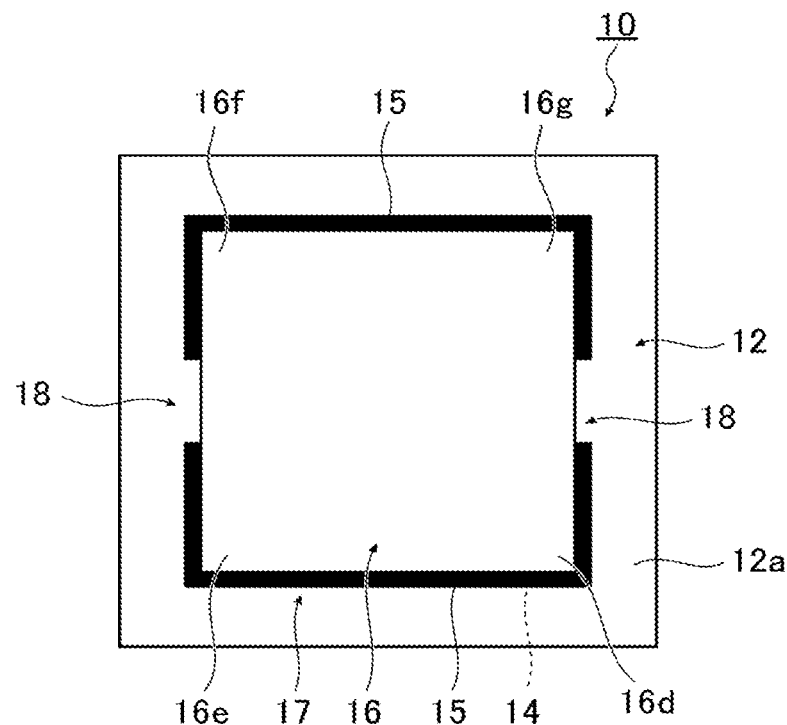
FIG. 9 is a plan view schematically showing an eighth example of the laminated body according to the embodiment of the present invention.

FIG. 3 is a plan view schematically showing a second example of the laminated body of the embodiment of the present invention. FIG. 4 is a plan view schematically showing a third example of the laminated body of the embodiment of the present invention. FIG. 5 is a plan view schematically showing a fourth example of the laminated body of the embodiment of the present invention. FIG. 6 is a plan view schematically showing a fifth example of the laminated body of the embodiment of the present invention. FIG. 7 is a plan view schematically showing a sixth example of the laminated body of the embodiment of the present invention. FIG. 8 is a plan view schematically showing a seventh example of the laminated body of the embodiment of the present invention. FIG. 9 is a plan view schematically showing an eighth example of the laminated body of the embodiment of the present invention. In FIGS. 3 to 9, the same components as those shown in FIGS. 1 and 2 are denoted by the same reference numerals, and a detailed description thereof is omitted. In each of laminated bodies 10 shown in FIGS. 3 to 9, the glass substrate 12, the adhesion layer 14, and the resin layer 16 have a quadrangular shape in plan view, similarly to the laminated body 10 in FIG. 1.

For example, as shown in FIG. 3, the side-contact portion 15 may be provided continuously on two sides connected to each other among four sides on the entire circumference of the outer edge 17 of the resin layer 16. As shown in FIG. 4, the side-contact portion 15 may be provided continuously over three connected sides among the four sides on the entire circumference of the outer edge 17 of the resin layer 16. Among the three sides, one side sandwiched between two sides is provided with the side-contact portion 15 over the entire region, and the two opposing sides are not entirely provided with the side-contact portion 15 over the side region.

As shown in FIG. 5, the side-contact portion 15 may be provided continuously on the entire circumference of the outer edge 17 of the resin layer 16 except for one corner portion 16d. In other words, on the entire circumference of the outer edge 17 of the resin layer 16, the side-contact portion 15 may be provided at a maximum of three corner portions 16e, 16f, and 16g among the four corner portions 16d, 16e, 16f, and 16g. Since the side-contact portion 15 is not provided at one corner portion 16d, the resin layer 16 is easily peeled off by attaching a tape or the like when peeling off the resin layer 16.

The side-contact portion 15 is not limited to being provided continuously along the outer edge 17 of the resin layer 16, and may be provided at an interval 18 along the outer edge 17 of the resin layer 16. For example, as shown in FIG. 6, the side-contact portion 15 may be provided on the entire region of one side and two corner portions 16e and 16f in three continuous sides of the resin layer 16, and the side-contact portion 15 may be provided at the interval 18 on a side connecting the two corner portions 16e and 16f.

As shown in FIG. 7, the side-contact portion 15 may be provided on the entire region of one side of the four sides of the resin layer 16, and the side-contact portion 15 may be provided in the vicinity of a central portion of each of the remaining three sides.

As shown in FIG. 8, the side-contact portion 15 may be provided on the entire region of each of two opposing sides of the four sides of the resin layer 16. In this way, the side-contact portion 15 may be separated from each other.

As shown in FIG. 9, the side-contact portion 15 may be provided on all the corner portions 16d, 16e, 16f, and 16g on the entire circumference of the outer edge 17 of the resin layer 16, and the side-contact portion 15 may be provided at the interval 18 on two opposing sides of the four sides. As described above, the side-contact portion 15 may be provided on the four corner portions 16d, 16e, 16f, and 16g, and may be provided to be partially separated from each other on the entire circumference of the outer edge 17 of the resin layer 16.

The laminated body 10 is not limited to a quadrangular shape, and may have another shape, for example, a circular shape.

Figure 10:
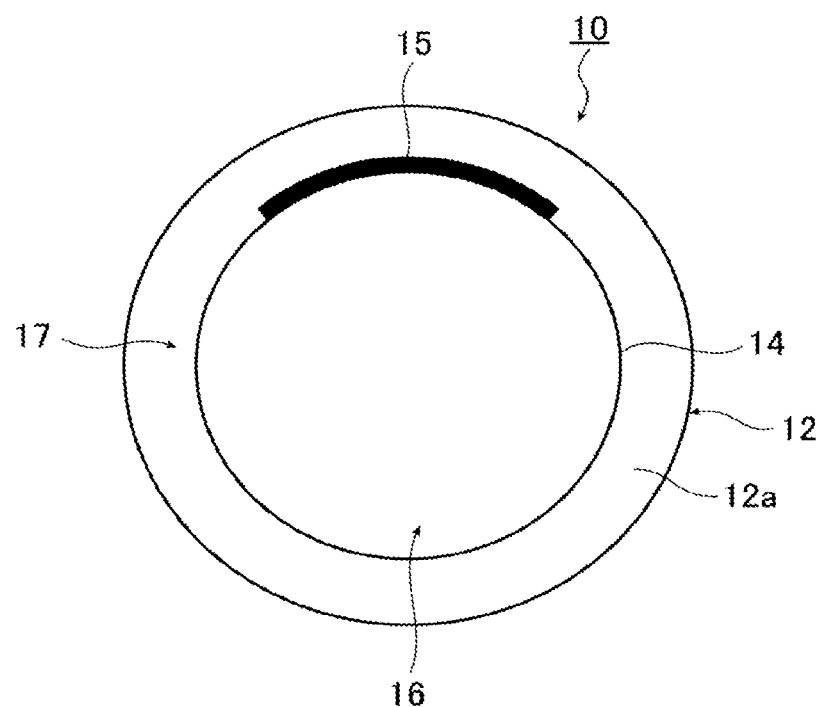
FIG. 10 is a plan view schematically showing a ninth example of the laminated body according to the embodiment of the present invention.
Figure 11:
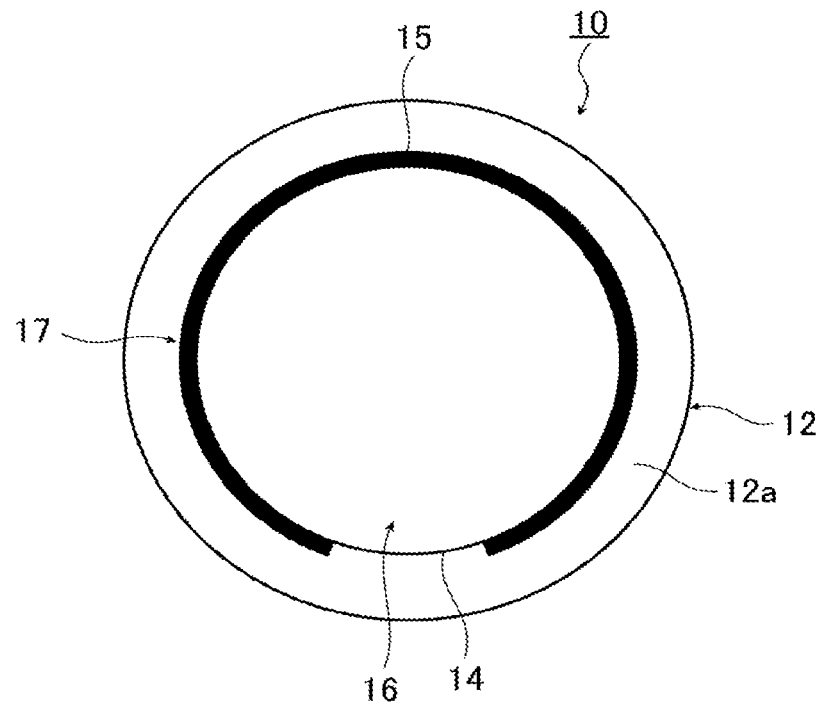
FIG. 11 is a plan view schematically showing a tenth example of the laminated body according to the embodiment of the present invention.
Figure 12:
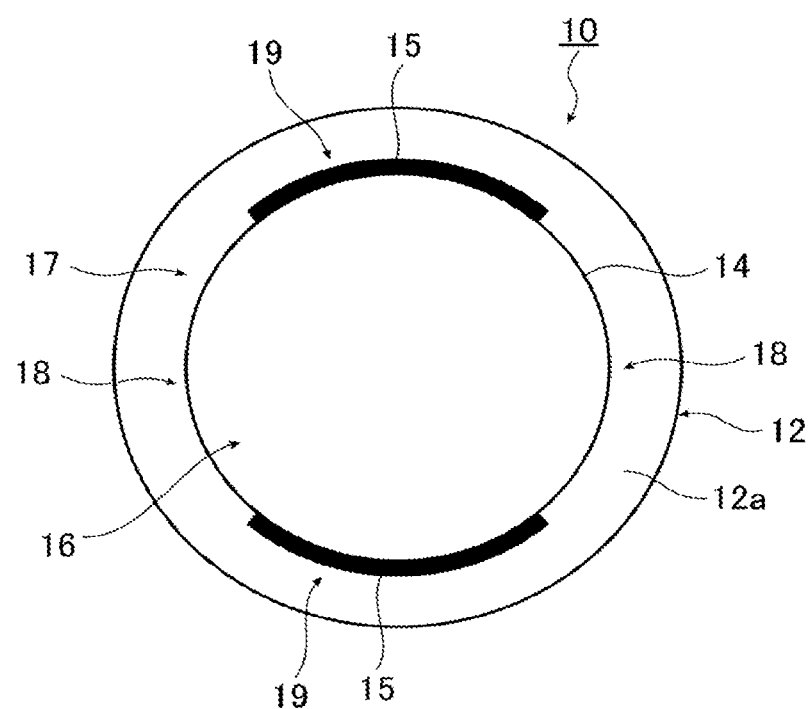
FIG. 12 is a plan view schematically showing an eleventh example of the laminated body according to the embodiment of the present invention.

FIG. 10 is a plan view schematically showing a ninth example of the laminated body of the embodiment of the present invention. FIG. 11 is a plan view schematically showing a tenth example of the laminated body of the embodiment of the present invention. FIG. 12 is a plan view schematically showing an eleventh example of the laminated body of the embodiment of the present invention. In FIGS. 10 to 12, the same components as those shown in FIGS. 1 and 2 are denoted by the same reference numerals, and a detailed description thereof is omitted.

In each of laminated bodies 10 shown in FIGS. 10 to 12, the glass substrate 12, the adhesion layer 14, and the resin layer 16 have a circular shape in plan view, and the glass substrate 12 is larger than the adhesion layer 14 and the resin layer 16.

As shown in FIG. 10, the side-contact portion 15 may be provided continuously on a part of the entire circumference of the outer edge 17 of the resin layer 16 having a circular shape.

As shown in FIG. 11, the side-contact portion 15 may be provided continuously on the entire circumference of the outer edge 17 of the resin layer 16 except for a part thereof.

As shown in FIG. 12, the side-contact portion 15 may be provided on each of opposed arc portions 19, respectively, in the outer edge 17 of the resin layer 16 having a circular shape.

As described above, in the laminated body 10, the side-contact portion 15 may be provided continuously along the outer edge 17 of the resin layer 16 or may be provided at the interval 18 along the outer edge 17 of the resin layer 16.

When the side-contact portion 15 is provided continuously or at the interval 18 along the outer edge 17 of the resin layer 16, the direction of the laminated body or the type of the laminated body can be distinguished by the continuous or discontinuous disposing layout of the side-contact portion 15 with respect to the laminated body in which the size of the glass substrate 12 or the resin layer 16 is similar.

In addition, when the side-contact portion 15 is provided at the interval 18 along the outer edge 17 of the resin layer 16, for example, a boundary between an area where the adhesion layer 18 is present and an area where the adhesion layer 18 is not present in the side-contact portion 15 can be visually recognized, and thus alignment adjustment by camera imaging or the like can be performed using the boundary as an alignment reference.

Hereinafter, the glass substrate 12, the adhesion layer 14, and the resin layer 16 constituting the laminated body 10 is described in detail.

(Glass Substrate)

The glass substrate 12 is a member that supports and reinforces the adhesion layer 14. In addition, the glass substrate 12 functions as a transport substrate.

The type of glass is preferably alkali-free borosilicate glass, borosilicate glass, soda lime glass, high silica glass, or other oxide-based glass containing silicon oxide as a main component. The oxide-based glass is preferably a glass having a silicon oxide content of 40 mass % to 90 mass % in terms of oxide.

More specifically, examples of a glass plate include a glass plate formed of alkali-free borosilicate glass (trade name "AN100" manufactured by AGC Co., Ltd., coefficient of linear expansion: $38 \times 10^{-7}/°$ C., trade name "AN-Wizus" manufactured by AGC Co., Ltd.).

The glass plate is generally manufactured by melting a glass raw material and forming the molten glass into a plate shape. Such a forming method may be a general one, and examples thereof include a float method, a fusion method, and a slot down-draw method.

The glass substrate 12 is preferably not flexible. Therefore, the thickness of the glass substrate 12 is preferably 0.3 mm or more, and more preferably 0.5 mm or more.

On the other hand, the thickness of the glass substrate 12 is preferably 1.0 mm or less.

The shape of the glass substrate 12 when observed from the normal direction of the surface 12a of the glass substrate 12 is not particularly limited, and may be a quadrangle or a circle, but is preferably a quadrangle.

The glass substrate 12 is larger than the adhesion layer 14 and the resin layer 16. The surface 12a of the glass substrate 12 has a peripheral region where the adhesion layer 14 and the resin layer 16 are not disposed. The surface 12a of the peripheral edge region of the glass substrate 12 is exposed.

The width of the peripheral edge region is not particularly limited, but is preferably 1 mm to 30 mm, and more preferably 3 mm to 10 mm. The width of the peripheral edge region corresponds to a distance from the outer peripheral edge of the glass substrate 12 to the outer edge 17 of the resin layer 16, as shown in FIG. 1.

When the width of the peripheral edge region is 30 mm or less, the effective area in forming an electronic device or the like is further increased, and thus the manufacturing efficiency of the electronic device is improved. In addition, since the width of the peripheral edge region is 1 mm or more, peeling of a polyimide film is less likely to occur when the polyimide film is formed on the adhesion layer 14.

(Adhesion Layer)

The adhesion layer 14 is a film for preventing peeling of a polyimide film (not shown) disposed thereon.

The adhesion layer 14 is disposed on the surface 12a of the glass substrate 12 such that a peripheral edge region that does not come into contact with the adhesion layer 14 remains on the glass substrate 12. In addition, the adhesion layer 14 includes the side-contact portion 15 described above.

The adhesion layer 14 may be an organic layer or an inorganic layer.

Examples of the material of the organic layer include an acrylic resin, a polyolefin resin, a polyurethane resin, a polyimide resin, a silicone resin, a polyimide silicone resin, and a fluorine resin. Alternatively, the adhesion layer 14 may be formed by mixing several kinds of resins.

Examples of the material of the inorganic layer include oxides, nitrides, oxynitrides, carbides, carbonitrides, silicides, and fluorides. Examples of oxides (preferably, a metal oxide), nitrides (preferably, a metal nitride), and oxynitrides (preferably, a metal oxynitride) include oxides, nitrides, and oxynitrides of one or more elements selected from Si, Hf, Zr, Ta, Ti, Y, Nb, Na, Co, Al, Zn, Pb, Mg, Bi, La, Ce, Pr, Sm, Eu, Gd, Dy, Er, Sr, Sn, In, and Ba.

Examples of carbides (preferably a metal carbide) and carbonitrides (preferably a metal carbonitride) include carbides, carbonitrides, and carbonates of one or more elements selected from Ti, W, Si, Zr, and Nb.

Examples of silicides (preferably, a metal silicide) include silicides of one or more elements selected from Mo, W, and Cr.

Examples of fluorides (preferably, a metal fluoride) include fluorides of one or more elements selected from Mg, Y, La, and Ba.

The adhesion layer 14 may be a plasma polymerized film.

When the adhesion layer 14 is a plasma polymerized film, examples of the material for forming the plasma polymerization film include fluorocarbon monomers such as $CF_4$, $CHF_3$, $C_2H_6$, $C_3H_6$, $C_2H_2$, $CH_3F$, and $C_4H_8$; hydrocarbon monomers such as methane, ethane, propane, ethylene, propylene, acetylene, benzene, and toluene; hydrogen; and $SF_6$.

Among these, from the viewpoint of heat resistance and peelability, as the material of the adhesion layer 14, a silicone resin and a polyimide silicone resin are preferable, a silicone resin is more preferable, and a silicone resin formed of a condensation reaction type silicone is more preferable.

Hereinafter, an aspect in which the adhesion layer is a silicone resin layer is described in detail.

The silicone resin is a resin containing a predetermined organosiloxy unit, and is usually obtained by curing a curable silicone. The curable silicone is classified into addition reaction type silicones, condensation reaction type silicones, ultraviolet curing type silicones, and electron beam curing type silicones by the curing mechanism thereof, and any of them can be used. Among these, condensation reaction type silicones are preferable.

As the condensation reaction type silicones, a hydrolyzable organosilane compound as a monomer or a mixture thereof (monomer mixture), or a partially hydrolyzed condensate (organopolysiloxane) obtained by partially hydrolyzing and condensing a monomer or a monomer mixture can be suitably used.

A silicone resin can be formed by using the condensation reaction type silicone and allowing a hydrolysis and condensation reaction (sol-gel reaction) to proceed.

The adhesion layer 14 is preferably formed using a curable composition containing curable silicone.

The curable composition may contain, in addition to the curable silicone, a solvent, a platinum catalyst (when an addition reaction type silicone is used as the curable silicone), a leveling agent, a metal compound, and the like.

Examples of the metal element contained in the metal compound include 3d transition metals, 4d transition metals, lanthanoid-based metals, bismuth (Bi), aluminum (Al), and tin (Sn). The content of the metal compound is not particularly limited and is appropriately adjusted.

The adhesion layer 14 preferably has a hydroxy group. A part of a Si—O—Si bond constituting the silicone resin of the adhesion layer 14 may be broken, and a hydroxy group may appear. When the condensation reaction type silicone is used, the hydroxy group thereof may be the hydroxy group of the adhesion layer 14.

The thickness of the adhesion layer 14 in the normal direction of the surface 12a of the glass substrate 12 is preferably 50 μm or less, more preferably 30 μm or less, and still more preferably 12 μm or less. On the other hand, the thickness of the adhesion layer 14 is preferably more than 1 μm, and is more preferably 6 μm or more from the viewpoint of more excellent foreign substance embeddability. The thickness is obtained by measuring the thickness of the adhesion layer 14 at any position of five or more points with a contact-type film thickness measuring device and arithmetically averaging the measured thicknesses.

It should be noted that the excellent foreign substance embeddability means that even when there is a foreign substance between the glass substrate 12 and the adhesion layer 14, the foreign substance is embedded in the adhesion layer 14. When the foreign substance embeddability is excellent, convex portions due to the foreign substance are less likely to be generated in the adhesion layer, and a risk of disconnection or the like in the member for an electronic device due to the convex portions is inhibited in the case where the member for an electronic device is formed on the polyimide film. Since voids formed when the convex portions are generated are observed as bubbles, the foreign substance embeddability can be evaluated by the presence or absence of the generation of the bubbles.

When the polyimide film is formed on the glass substrate 12 and heat-treated at a high temperature, the polyimide film turns yellow, which makes it difficult to apply the polyimide film to a transparent electronic device. However, although the mechanism is unknown, yellowing of the polyimide film due to the high-temperature heat treatment can be inhibited by forming the adhesion layer 14 on the glass substrate 12 and forming the polyimide film on the adhesion layer 14.

(Resin Layer)

The laminated body 10 includes the resin layer 16 disposed so as to cover the adhesion layer 14. The resin layer 16 functions as a protective layer and is also referred to as a protective film.

The resin layer 16 protects the surface of the adhesion layer 14 until a polyimide varnish, which is described later, is applied onto the adhesion layer 14, for example, during transportation of the laminated body 10. Therefore, it is necessary that the resin layer 16 is not easily peeled off during handling, and is easily peeled off during a process of peeling off the resin layer.

Examples of the material constituting the resin layer 16 include a polyimide resin, a polyester resin (for example, polyethylene terephthalate or polyethylene naphthalate), a polyolefin resin (for example, polyethylene or polypropylene), and a polyurethane resin. Among these, a polyester resin is preferable, and polyethylene terephthalate is more preferable.

The thickness of the resin layer 16 is preferably 20 μm or more, more preferably 30 μm or more, and still more preferably 50 μm or more in order to reduce the influence of external force. As for the upper limit, the thickness of the resin layer 16 is preferably 500 μm or less, more preferably 300 μm or less, and still more preferably 100 μm or less.

The resin layer 16 may further include a second adhesion layer on the surface on the adhesion layer 14 side. That is, the second adhesion layer may be provided between the adhesion layer 14 and the resin layer 16.

As the second adhesion layer, a known pressure-sensitive adhesive layer can be used. Examples of a pressure-sensitive adhesive constituting the pressure-sensitive adhesion layer include a (meth)acrylic-based pressure-sensitive adhesive, a silicone-based pressure-sensitive adhesive, and a urethane-based pressure-sensitive adhesive.

The second adhesion layer may be formed of a resin, and examples of the resin include a vinyl acetate resin, an ethylene-vinyl acetate copolymer resin, a vinyl chloride-vinyl acetate copolymer resin, a (meth)acrylic resin, a butyral resin, a polyurethane resin, and a polystyrene elastomer.

The surface roughness (Ra) of the resin layer 16 is preferably 50 nm or less, more preferably 30 nm or less, and still more preferably 15 nm or less in order to reduce the peeling force when peeling off the resin layer 16. In addition, Ra is preferably 0.1 nm or more, and more preferably 0.5 nm or more because a state where the resin layer 16 and the adhesion layer are in close contact with each other can be maintained. The surface roughness (Ra) is measured using a non-contact surface/layer cross-sectional shape measuring system "Vertscan R3300-lite" manufactured by Mitsubishi Chemical System Corporation.

<Method for Manufacturing Laminated Body>

A method for manufacturing a laminated body includes a step 1 of laminating an adhesion layer-attached resin layer (not shown), which has the resin layer 16 and the adhesion layer 14, to the glass substrate 12 so that the adhesion layer 14 and the glass substrate 12 face each other; and a step 2 of performing a heat treatment on the laminated substrate obtained in step 1 at a temperature equal to or higher than a softening point of the adhesion layer 14.

By performing the heat treatment in step 2, the adhesion layer 14 having the side-contact portion 15 described above is formed.

The adhesion layer 14 is formed, for example, by applying a curable composition containing curable silicone and subjecting the formed coating film to a heat treatment. The heating temperature in the heat treatment of the coating film is preferably 50° C. to 200° C., and the heating time is preferably 5 minutes to 20 minutes.

As described above, the side-contact portion 15 can be formed by performing the heat treatment on the laminated substrate at a temperature equal to or higher than the softening point of the adhesion layer 14 in step 2. The temperature equal to or higher than the softening point of the adhesion layer 14 is a crawling-up start temperature of the adhesion layer 14.

The softening point of the adhesion layer 14 is a value obtained by shaving the adhesion layer formed on the protective film and performing the measurement according to "JIS (Japanese Industrial Standards) K 5601-2-2_Method of measuring softening point". When the adhesion layer 14 is formed of a silicone resin, the temperature of the softening point is 80° C.

As described above, the disposing form and the providing range of the side-contact portion 15 are various. For example, the disposing form and the providing range of the side-contact portion 15 can be controlled by adjusting the heating range at the time of the heat treatment in step 2.

In this case, for example, in step 2 of performing the heat treatment described above, the outer edge 17 of the resin layer 16 is separated into a region to be heated to a temperature equal to or higher than the softening point of the adhesion layer 14 and a region to be heated to a temperature lower than the softening point of the adhesion layer 14 when observing the laminated substrate from the normal direction of the surface 12a of the glass substrate 12, and the heat treatment is performed. The region to be heated to a temperature equal to or higher than the softening point of the adhesion layer 14 may be provided continuously or may be provided at an interval. By changing the region to be heated to a temperature equal to or higher than the softening point of the adhesion layer 14, the disposing form of the side-contact portion 15 shown in FIG. 1 and FIGS. 3 to 12 can be achieved.

The region to be heated to a temperature equal to or higher than the softening point of the adhesion layer 14 and the region to be heated to a temperature lower than the softening point of the adhesion layer 14 can be separated by, for example, disposing a heat insulating material or a cooling member as described later.

For example, the side-contact portion 15 may be formed using a heating plate (not shown). In this case, step 2 of performing the heat treatment described above includes a disposing step of disposing a laminated substrate on a heating plate with at least a part of the outer edge 17 of the resin layer 16 protruding from the edge of the heating plate when observing the laminated substrate from the normal direction of the surface 12a of the glass substrate 12. The protruding region of the outer edge 17 of the resin layer 16 is a region that is not heated at a temperature equal to or higher than the softening point of the adhesion layer 14.

After the disposing step, a heat treatment is performed on the laminated substrate by the heating plate at a temperature equal to or higher than the softening point of the adhesion layer 14. Accordingly, the side-contact portion 15 is not formed in a region of the outer edge 17 of the resin layer 16 protruding from the edge of the heating plate, and the side-contact portion 15 is formed in the outer edge 17 of the resin layer 16 disposed on the heating plate. As the heating plate, for example, a hot plate is used.

In addition, in step 2 of performing the heat treatment, the outer edge 17 of the resin layer 16 is separated into a region to be heated to a temperature equal to or higher than the softening point of the adhesion layer 14 and a region to be heated to a temperature lower than the softening point of the adhesion layer 14 when observing the laminated substrate from the normal direction of the surface 12a of the glass substrate 12, and the heat treatment is performed on the region to be heated to a temperature equal to or higher than the softening point of the adhesion layer 14 by applying hot air or irradiating with light.

As described above, the region where the side-contact portion 15 of the adhesion layer 14 is to be formed may be selectively heated by applying hot warm air or being irradiated with light from the resin layer 16 side to form the side-contact portion 15. As a result, the disposing form of the side-contact portion 15 shown in FIGS. 1 and 3 to 12 can be achieved. As the hot air, for example, a hot air blower such as a dryer or a hot air heater is used, and hot air having a temperature equal to or higher than the softening point is applied to heat the adhesion layer 14. In addition, a lamp heater or a halogen lamp is used for light irradiation, and the adhesion layer 14 is heated to a temperature equal to or higher than the softening point by light.

Step 2 of performing the heat treatment includes a disposing step of disposing a heat insulating material (not shown) or a cooling member (not shown) on the outer edge 17 of the resin layer 16 when observing the laminated substrate from the normal direction of the surface 12a of the glass substrate 12. After the disposing step, the heat treatment is preferably performed on the laminated substrate at a temperature equal to or higher than the softening point of the adhesion layer 14.

Specifically, in step 2, a heat insulating material or a cooling member is installed in a region where the side-contact portion 15 is not desired to be present in the outer edge 17 of the resin layer 16. In this state, the above-described heat treatment is performed. As a result, in the outer periphery of the outer edge of the resin layer 16, the adhesion layer 14 does not seep out in the region where the heat insulating material or the cooling member is disposed, and thus the side-contact portion 15 is not formed. By changing the disposing pattern of the heat insulating material or the cooling member, the disposing form of the side-contact portion 15 shown in FIGS. 1 and 3 to 12 can be achieved.

As the heat insulating material, for example, a fluorine resin such as polytetrafluoroethylene, a silica cloth, and an alumina fiber can be used.

The heat insulating material inhibits conduction of heat to the adhesion layer 14 so as not to form the side-contact portion 15 of the adhesion layer 14. Therefore, the heat insulating material is preferably disposed between the heat source and the adhesion layer 14. For example, when the laminated substrate is heated from the glass substrate 12 side, the heat insulating material is disposed at a position corresponding to the outer edge 17 of the resin layer 16 on the surface side opposite to the surface 12a of the glass substrate 12. On the other hand, when heating is performed from the resin layer 16 side, the heat insulating material is disposed at a position corresponding to the outer edge 17 of the resin layer 16 on the surface 16a side of the resin layer 16.

Similarly to the method using the heat insulating material described above, it is possible to inhibit the conduction of heat to the adhesion layer 14 and prevent the side-contact portion 15 of the adhesion layer 14 from being formed even when the cooling member is used.

As the cooling member, for example, a Peltier element, a water cooling type cooling plate, and an air cooling type cooling plate can be used.

As described above, step 2 of performing the heat treatment preferably includes a disposing step of disposing the heat insulating material or the cooling member on the outer edge of the resin layer of the laminated substrate. After the disposing step of the heat insulating material or the cooling member, the heat treatment is preferably performed on the laminated substrate at a temperature equal to or higher than the softening point of the adhesion layer 14.

For example, when the side-contact portion 15 is provided in a range of 25% to 99% of the entire circumference of the outer edge 17 of the resin layer 16, in the disposing step, the heat insulating material or the cooling member is disposed in a range of 1% to 75% of the entire circumference of the outer edge 17 of the resin layer 16. In addition, for example, the region to be heated to a temperature lower than the softening point of the adhesion layer 14 is in a range of 1% to 75% of the entire circumference of the outer edge 17 of the resin layer 16.

In a case where the resin layer 16 has a quadrangular shape and the side-contact portion 15 is not located at least one of the corner portions of the resin layer 16, for example, in the disposing step, the heat insulating material or the cooling member is provided at a maximum of three corner portions among four corner portions of the resin layer.

In the case where the side-contact portion 15 is provided continuously along the outer edge 17 of the resin layer 16 or is provided at the interval along the outer edge 17 of the resin layer 16, in the disposing step, the heat insulating material or the cooling member is preferably disposed continuously along the outer edge 17 of the resin layer 16 or provided at the interval along the outer edge 17 of the resin layer 16.

Step 2 of a heat treatment on the laminated substrate obtained in step 1 at a temperature equal to or higher than the softening point of the adhesion layer 14 is performed after step 1 of laminating as described above, and step 2 includes a first heat treatment and a second heat treatment.

The first heat treatment is, for example, a heat treatment in which heating and pressurization are performed using an autoclave under a condition of a temperature lower than the softening point of the adhesion layer 14. In the first heat treatment, the adhesion force of the interface between the glass substrate 12 and the adhesion layer 14 is increased. The second heat treatment is, for example, a heating treatment in which heating is performed at a temperature equal to or higher than the softening point of the adhesion layer using a heating plate. By the second heat treatment, the adhesion layer 14 is caused to crawl up on the side surface 16b of the resin layer 16 to form the side-contact portion 15. The step of the second heat treatment described above is a step of forming the side-contact portion 15 described above, and is included in step 2 of performing the heat treatment.

The heating temperature in the first heating treatment is not particularly limited as long as the heating temperature is a temperature lower than the softening point of the resin layer 16. The heating time is preferably 10 minutes to 60 minutes, and more preferably 20 minutes to 40 minutes.

The pressure during the pressurization treatment is preferably 0.5 MPa to 1.5 MPa, and more preferably 0.8 MPa to 1.0 MPa.

The heat treatment may be performed a plurality of times as long as the temperature condition is lower than the softening point of the adhesion layer 14. When the heat treatment is performed a plurality of times, the respective heating conditions may be changed.

In addition, when the heat treatment is performed a plurality of times, the presence or absence of the pressurizing treatment may be changed. For example, in a case where the heat treatment is performed twice, the pressurizing treatment may be performed together in the first heat treatment, and the pressurizing treatment may not be performed in the second heat treatment.

When manufacturing the laminated body using a transfer film, the heat treatment may be performed after a temporary support is peeled off, or the heat treatment may be performed in a state where the temporary support is disposed on the adhesion layer. When the heat treatment is performed a plurality of times, the temporary support may be peeled off between the heat treatments. For example, after the first heat treatment is performed, the temporary support may be peeled off, and the second heat treatment may be performed.

In the laminated body, a surface treatment may be performed on the surface of the adhesion layer after the resin layer 16 is peeled off.

Examples of the surface treatment include a corona treatment, a plasma treatment, and a UV ozone treatment, and a corona treatment is preferable.

When a polyimide film is formed on the adhesion layer as described later, the surface roughness (Ra) of the adhesion layer is preferably 50 nm or less, more preferably 30 nm or less, and still more preferably 15 nm or less because the surface roughness of the polyimide film is reduced. In addition, Ra is preferably 0.1 nm or more, and more preferably 0.5 nm or more because a state where the polyimide film and the adhesion layer are in close contact with each other can be maintained.

<Method for Removing Side-Contact Portion>

The resin layer 16 is peeled off, for example, before the polyimide film is formed on the adhesion layer 14. When the resin layer 16 is peeled off, it is necessary to remove the side-contact portion 15. A method for removing the side-contact portion 15 is not particularly limited, and examples thereof include methods shown in FIGS. 13 to 18.

Figure 13:
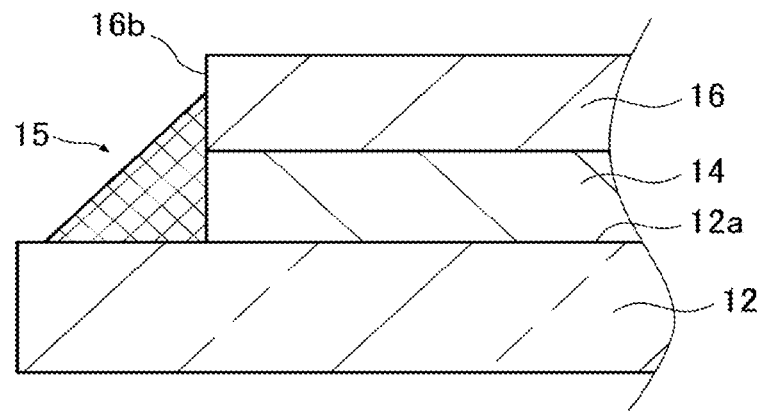
FIG. 13 is a cross-sectional view schematically showing a first example of a method for removing a side-contact portion.
Figure 14:
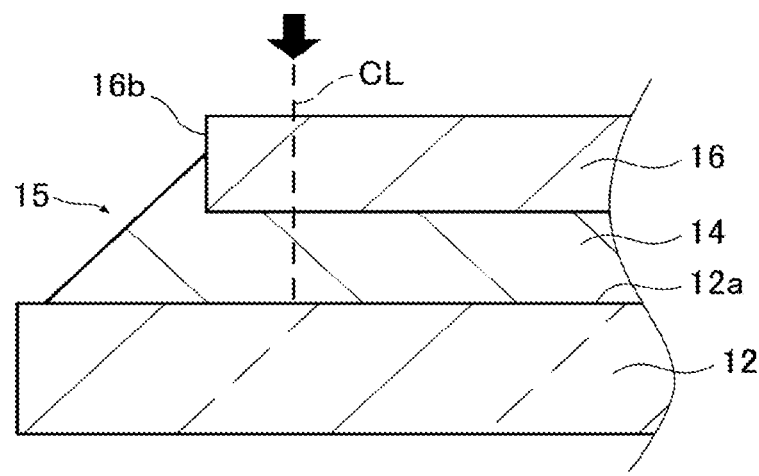
FIG. 14 is a cross-sectional view schematically showing a second example of the method for removing a side-contact portion.
Figure 15:
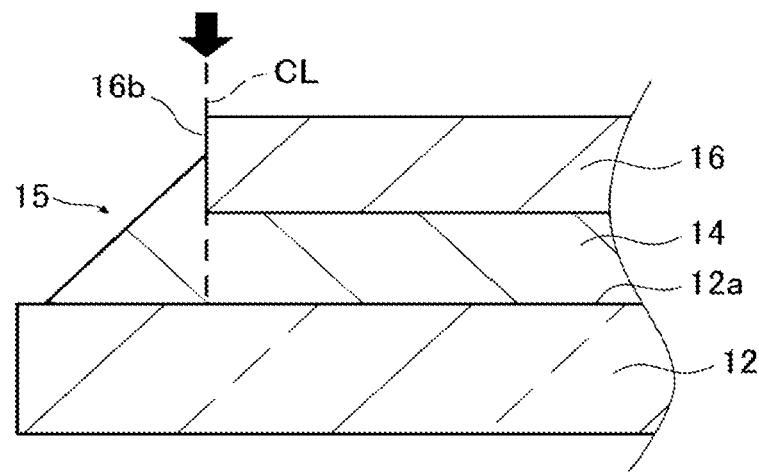
FIG. 15 is a cross-sectional view schematically showing a third example of the method for removing a side-contact portion.
Figure 16:
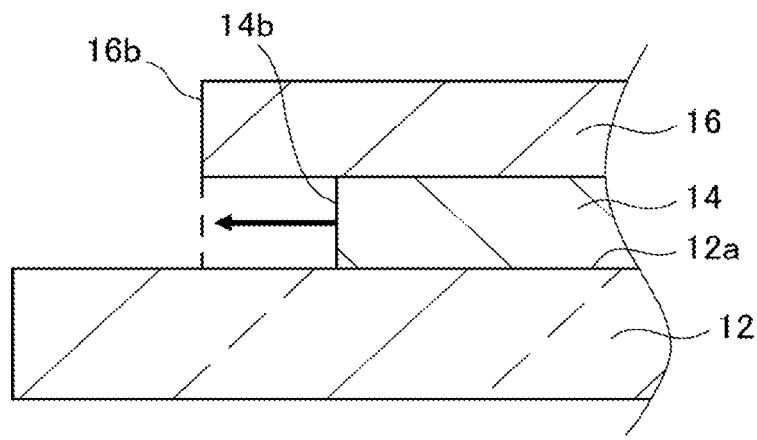
FIG. 16 is a cross-sectional view schematically showing a fourth example of the method for removing a side-contact portion.
Figure 17:
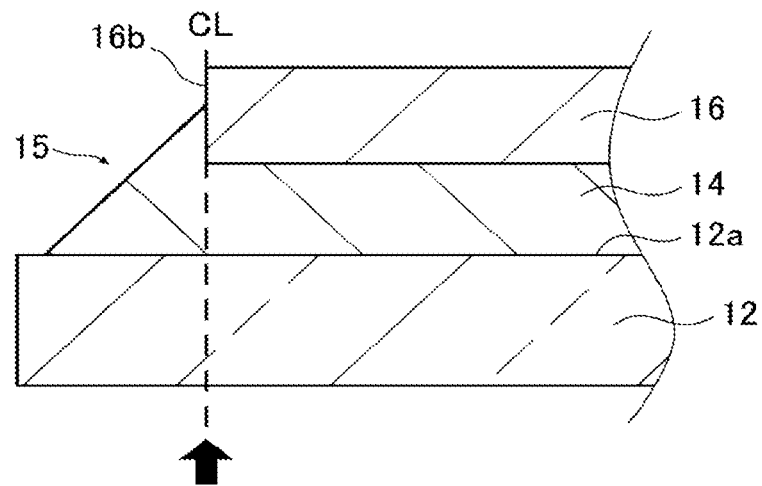
FIG. 17 is a cross-sectional view schematically showing a fifth example of the method for removing a side-contact portion.
Figure 18:
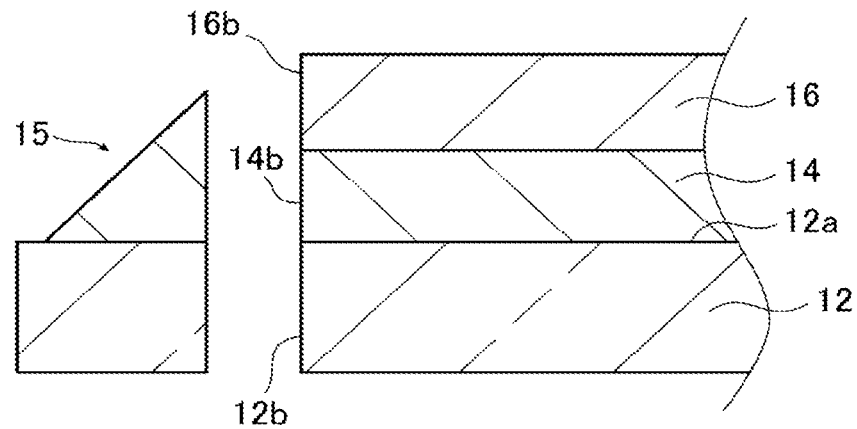
FIG. 18 is a cross-sectional view schematically showing the fifth example of the method for removing a side-contact portion.

FIG. 13 is a cross-sectional view schematically showing a first example of the method for removing a side-contact portion. FIG. 14 is a cross-sectional view schematically showing a second example of the method for removing a side-contact portion. FIG. 15 is a cross-sectional view schematically showing a third example of the method for removing a side-contact portion. FIG. 16 is a cross-sectional view schematically showing a fourth example of the method for removing a side-contact portion. FIG. 17 is a cross-sectional view schematically showing a fifth example of the method for removing a side-contact portion. FIG. 18 is a cross-sectional view schematically showing the fifth example of the method for removing a side-contact portion. In FIGS. 13 to 18, the same components as those shown in FIGS. 1 and 2 are denoted by the same reference numerals, and a detailed description thereof is omitted.

The first example of the method for removing the side-contact portion 15 is a method of dissolving and removing the side-contact portion 15 shown in FIG. 13 using a solvent that dissolves the adhesion layer 14. In addition to the dissolution, the side-contact portion 15 may be physically removed using a tape, or the side-contact portion 15 may be removed by being scraped using a file or the like.

The second example of the method for removing the side surface contact portion 15 shown in FIG. 14 is a method of removing the side-contact portion 15 by cutting the resin layer 16 and the adhesion layer 14 along a cutting line CL. The cutting line CL is located inside the side surface 16b of the resin layer 16. By cutting along the cutting line CL, there is no side-contact portion 15 on a new side surface of the resin layer 16 formed by the cutting.

The third example of the method for removing the side-contact portion 15 shown in FIG. 15 is a method of cutting and removing the side-contact portion 15 from the resin layer 16 side along the cutting line CL along the side surface 16b of the resin layer 16.

The fourth example shown in FIG. 16 is a method in which the resin layer 16 is laminated so as to protrude from the side surface 14b of the adhesion layer 14 in advance, the side surface 14b of the adhesion layer 14 is extended by seeping out the adhesion layer 14 by the heat treatment process at a temperature equal to or lower than the softening point, and the protruding portion of the resin layer 16 is joined by the adhesion layer 14.

The fifth example of the method for removing the side-contact portion 15 shown in FIG. 17 is a method of cutting from the glass substrate 12 side along the cutting line CL along the side surface 16b of the resin layer 16 and removing the side-contact portion 15. In this case, as shown in FIG. 18, the side surface 12b of the glass substrate 12, the side surface 14b of the adhesion layer 14, and the side surface 16b of the resin layer 16 after the cutting coincide with each other.

After the side-contact portion 15 of the adhesion layer 14 is removed as described above, for example, the resin layer 16 is peeled off using a tape.

<Laminated Substrate and Method for Manufacturing Same>

A laminated substrate including the glass substrate 12, the adhesion layer 14, and a polyimide film (not shown) can be manufactured by using the laminated body 10 described above.

Specifically, as a method for manufacturing the laminated substrate, there is a method in which the resin layer 16 is peeled off, a polyimide varnish containing polyimide and a solvent is applied to the adhesion layer 14 side of the glass substrate 12, and a polyimide film is formed on the peripheral edge region and the adhesion layer 14 to form a laminated substrate including the glass substrate 12, the adhesion layer 14, and the polyimide film in this order.

In the laminated substrate, after an electronic device is produced on the polyimide film on the adhesion layer, the polyimide film can be peeled off from the glass substrate by a physical force.

Hereinafter, the method for manufacturing the laminated substrate is described in detail, and then the configuration of the polyimide film is described in detail.

(Polyimide Varnish)

The polyimide varnish contains polyimide or a precursor thereof and a solvent.

Polyimide is generally obtained by polycondensing and imidizing tetracarboxylic dianhydride and diamine. The polyimide preferably has solvent solubility.

Examples of the tetracarboxylic dianhydride to be used include an aromatic tetracarboxylic dianhydride and an aliphatic tetracarboxylic dianhydride. Examples of the diamine to be used include an aromatic diamine and an aliphatic diamine.

Examples of the aromatic tetracarboxylic dianhydride include pyromellitic anhydride (1,2,4,5-benzenetetracarboxylic dianhydride), 3,3',4,4'-benzophenonetetracarboxylic dianhydride, 3,3',4,4'-biphenyltetracarboxylic dianhydride, and 3,3',4,4'-diphenyl ether tetracarboxylic dianhydride.

Examples of the aliphatic tetracarboxylic dianhydride include cyclic or acyclic aliphatic tetracarboxylic dianhydride. Examples of the cyclic aliphatic tetracarboxylic dianhydride include 1,2,3,4-cyclobutanetetracarboxylic dianhydride, 1,2,4,5-cyclohexanetetracarboxylic dianhydride, and 1,2,4,5-cyclopentanetetracarboxylic dianhydride. Examples of the acyclic aliphatic tetracarboxylic dianhydride include 1,2,3,4-butanetetracarboxylic dianhydride and 1,2,3,4-pentanetetracarboxylic dianhydride.

Examples of the aromatic diamine include 4,4'-oxydiaminobenzene (4,4'-diaminodiphenyl ether), 1,3-bis-(3-aminophenoxy)benzene, 4,4'-bis-(3-aminophenoxy)biphenyl, 1,4-diaminobenzene, and 1,3-diaminobenzene.

Examples of the aliphatic diamine include acyclic aliphatic diamines such as ethylenediamine, hexamethylenediamine, polyethylene glycol bis(3-aminopropyl)ether, and polypropylene glycol bis(3-aminopropyl)ether; and cyclic aliphatic diamines such as 1,3-bis(aminomethyl)cyclohexane, 1,4-bis(aminomethyl)cyclohexane, isophoronediamine, and norbornediamine.

The precursor of polyimide means a polyamic acid (so-called polyamic acid and/or polyamic acid ester) in a state before imidization.

The solvent may be any solvent that dissolves the polyimide or the precursor thereof, and examples thereof include a phenol-based solvent (for example, m-cresol), an amide-based solvent (for example, N-methyl-2-pyrrolidone, N,N-dimethylformamide, N,N-dimethylacetamide), a lactone-based solvent (for example, γ-butyrolactone, δ-valerolactone, ε-caprolactone, γ-clotonolactone, γ-hexanolactone, α-methyl-γ-butyrolactone, γ-valerolactone, α-acetyl-γ-butyrolactone, δ-hexanolactone), a sulfoxide-based solvent (for example, N,N-dimethylsulfoxide), a ketone-based solvent (for example, acetone, methyl ethyl ketone, methyl isobutyl ketone, cyclohexanone), and an ester-based solvent (for example, methyl acetate, ethyl acetate, butyl acetate, dimethyl carbonate).

(Procedure)

The method for applying the polyimide varnish to the adhesion layer 14 side of the laminated body 10 is not particularly limited, and a known method may be used. Examples thereof include a spray coating method, a die coating method, a spin coating method, a dip coating method, a roll coating method, a bar coating method, a screen printing method, and a gravure coating method.

After the coating, a heat treatment may be performed as necessary.

As the conditions for the heat treatment, the temperature condition is preferably 50 to 500° C., more preferably 50 to 450° C. The heating time is preferably 10 minutes to 300 minutes, and more preferably 20 minutes to 200 minutes.

The heat treatment may be performed a plurality of times. When the heat treatment is performed a plurality of times, the respective heating conditions may be changed.

The thickness of the polyimide film is preferably 1 μm or more, and more preferably 5 μm or more. From the viewpoint of flexibility, the thickness is preferably 1 mm or less, and more preferably 0.2 mm or less.

In order to form high-definition wiring and the like of an electronic device on the polyimide film, the surface of the polyimide film is preferably smooth. Specifically, the surface roughness Ra of the polyimide film is preferably 50 nm or less, more preferably 30 nm or less, and still more preferably 10 nm or less.

As for the coefficient of thermal expansion of the polyimide film, it is preferable that a difference in coefficient of thermal expansion between the polyimide film and the glass substrate 12 is small because warpage of the laminated substrate after heating or cooling can be inhibited. Specifically, the difference in thermal expansion coefficient between the polyimide film and the glass substrate 12 is preferably 0 to $90 \times 10^{-6}$/° C., and more preferably 0 to $30 \times 10^{-6}$/° C.

The area of the polyimide film is not particularly limited, but is preferably 300 cm$^2$ or more from the viewpoint of productivity of the electronic device.

The polyimide film may be colored or colorless and transparent.

The laminated substrate can be used for various applications, and examples thereof include applications for manufacturing electronic components such as a panel for a display device, a PV, a thin film secondary battery, a semiconductor wafer having a circuit formed on a surface thereof, and a reception sensor panel, which are described later. In these applications, the laminated body may be exposed to a high temperature condition (for example, 450° C. or more) in an air atmosphere (for example, 20 minutes or more).

The panel for a display device includes an LCD, an OLED, an electronic paper, a plasma display panel, a field emission panel, a quantum dot LED panel, a micro LED display panel, a MEMS shutter panel, and the like.

The reception sensor panel includes an electromagnetic wave reception sensor panel, an X-ray reception sensor panel, an ultraviolet ray reception sensor panel, a visible ray reception sensor panel, an infrared ray reception sensor panel, and the like. The substrate used for the reception sensor panel may be reinforced by a reinforcing sheet or the like formed of resin or the like.

EXAMPLE

Hereinafter, the present invention is specifically described with reference to Examples and the like, but the present invention is not limited to these Examples.

In the following, a glass plate formed of alkali-free borosilicate glass (coefficient of linear expansion: $38 \times 10^{-7}$/° C., trade name: "AN-Wizus" manufactured by AGC) was used as a glass substrate.

Hereinafter, Examples 2 to 7, Example 9, Example 10, Examples 12 to 14, Examples 16, Example 17, Examples 19 to 21, Example 23, and Example 24 are Examples, and Example 1, Example 8, Example 11, and Example 15, Example 18, Example 22, and Example 25 are Comparative Examples.

Example 1 and Example 11

(Preparation of Curable Silicone)

Triethoxy methylsilane (179 g), toluene (300 g), and acetic acid (5 g) were added to a 1 L flask, and the mixture was stirred at 25° C. for 20 minutes and further heated to 60° C. to react for 12 hours. The resulting crude reaction solution was cooled to 25° C., and then washed three times with water (300 g). Chlorotrimethylsilane (70 g) was added to the washed crude reaction solution, and the mixture was stirred at 25° C. for 20 minutes and further heated to 50° C. to react for 12 hours. The resulting crude reaction solution was cooled to 25° C., and then washed three times with water (300 g). Toluene was distilled off from the washed crude reaction solution under reduced pressure to form a slurry, and the slurry was dried overnight in a vacuum dryer to obtain a curable silicone 1 as a white organopolysiloxane compound. The curable silicone 1 had the number of T units: the number of M units=87:13 (molar ratio). In the curable silicone 1, the molar ratio of the M unit to the T unit was 13:87, all the organic groups were methyl groups, and the average number of OX groups was 0.02. The average number of OX groups is a numerical value indicating how many OX groups (X is a hydrogen atom or a hydrocarbon group) are bonded to one Si atom on average.

(Preparation of Curable Composition)

Curable silicone (20 g), a zirconium octylate compound ("Orgatix ZC-200", manufactured by Matsumoto Fine Chemical Co., Ltd.) (0.16 g) as a metal compound, cerium (III) 2-ethylhexanoate (manufactured by Alfa Aesar, metal content: 12%) (0.17 g), and Isoper G (manufactured by TonenGeneral Sekiyu K.K.) (19.7 g) as a solvent were mixed, and the obtained mixture was filtered using a filter having a pore size of 0.45 μm to obtain a curable composition 1.

(Production of Laminated Body Including Glass Plate and Silicone Resin Layer)

A PET film (Ester (registered trademark) film HPE, manufactured by Toyobo Co., Ltd., thickness: 25 μm and 50 μm) was prepared as a release film, and the prepared curable composition 1 was applied onto the film surface and heated at 140° C. for 10 minutes using a hot plate to form a silicone resin layer (adhesion layer). A PET film (Ester (registered trademark) film HPE, manufactured by Toyobo Co., Ltd., thickness: 50 μm) as a protective film (resin layer) was laminated to the coated silicone resin layer, a cutter was inserted from a PET film side of the release film, and the film was cut into a size of 912 mm×722 mm.

Further, a circular film was cut into a diameter of 196 mm by inserting a compass cutter (compass cutter 57B manufactured by Olfa Co., Ltd.) from the PET film side of the release film.

Subsequently, a glass plate "AN-Wizus" (support substrate) having a size of 920 mm×730 mm and a thickness of 0.5 mm, which was cleaned with an aqueous glass washing agent ("PK-LCG213" manufactured by Perker Corporation) and then with pure water, was prepared. Thereafter, the PET film of the protective film was peeled off from a film (size: 912 mm×722 mm) in which the PET film of the release film, the silicone resin layer, and the PET film of the protective film were laminated in this order, and the silicone resin layer side of the film including the PET film of the release film and the silicone resin layer were laminated to the glass plate, thereby producing a rectangular laminated substrate in which the glass plate, the silicone resin layer, and the PET film (resin layer) of the release film were disposed in this order.

For a circular laminated body, a glass plate "AN-Wizus" having a diameter of 200 mm and a thickness of 0.5 mm, which was washed with the aqueous glass cleaner ("PK-LCG213" manufactured by Perker Corporation) and then with pure water, was prepared. Thereafter, the PET film of the protective film was peeled off from a film (size: 196 mm in diameter) in which the PET film of the release film, the silicone resin layer, and the PET film of the protective film were laminated in this order, and the silicone resin layer side of the film including the PET film of the release film and the silicone resin layer were laminated to the glass plate, thereby producing a circular laminated substrate in which the glass plate, the silicone resin layer, and the PET film of the release film were disposed in this order.

Next, each of the obtained rectangular laminated substrate and circular laminated substrate was disposed in an autoclave, and heated under the conditions of 60° C. and 1 MPa for 30 minutes. Through this heat treatment step, a rectangular laminated body and a circular laminated body were obtained.

(Cross-Sectional SEM Observation 1 of Laminated Body)

The laminated substrate in which the glass plate, the silicone resin layer, and the PET film were disposed in this order was cut into small pieces, the cut surface of the laminated substrate was observed with FE-SEM (field emission scanning electron microscope, JSM-7800F Prime manufactured by JEOL Ltd.), and the side surface contact width of the silicone resin layer in the thickness direction of the side surface of the PET film was measured.

Examples 2 to 10 and 12 to 15

After a rectangular laminated body was prepared in the same manner as in Example 1, the laminated body including a glass plate, a silicone resin layer, and a PET film was directly placed on a hot plate (heating plate) at a position where a side-contact portion of the silicone resin layer was desired to be present on a side surface of the PET film, and a heat insulating material (PTFE (polytetrafluoroethylene) sheet, thickness: 1 mm) was placed between the hot plate and the laminated body at a position where the side-contact portion of the silicone resin layer was not desired to be present on the side surface of the PET film. The laminated body was heated on the hot plate at 90° C. for 5 minutes. The surface temperature of the laminated body on the heat insulating material during hot plate heating was 30° C. to 80° C., which was lower than the surface temperature of the laminated body without the heat insulating material. The laminated body after heating using the hot plate was manually stored in a cassette as a storage container.

In Examples 2 to 10 and 12 to 15, the disposing form of the side-contact portion, the disposing range of the side-contact portion, and the number of corner portions where the side-contact portion is disposed were adjusted as shown in Table 1 described later.

Examples 16 to 18

After a rectangular laminated body was prepared in the same manner as in Example 1, the laminated body including a glass plate, a silicone resin layer, and a PET film was directly placed on a hot plate (heating plate) at a position where a side-contact portion of the silicone resin layer was desired to be present on a side surface of the PET film, and a Peltier element was placed as a coolant at a position where the side-contact portion of the silicone resin layer was not desired to be present on the side surface of the PET film. The laminated body was heated on the hot plate at 90° C. for 5 minutes. The surface temperature of the laminated body on the coolant during hot plate heating was 20° C. to 50° C., which was lower than the surface temperature of the laminated body without the coolant. The laminated body after heating using the coolant was manually stored in a cassette as a storage container.

In Examples 16 to 18, the disposing form of the side-contact portion, the disposing range of the side-contact portion, and the number of corner portions where the side-contact portion is disposed were adjusted as shown in Table 1 described later.

Examples 19 to 22

After a rectangular laminated body was produced in the same manner as in Example 1, hot air was applied from a glass plate side of the laminated body to a position where a side-contact portion of a silicone resin layer was desired to be present on a side surface of a PET film using a hot air blower, and the laminated body was placed so that the hot air was not applied to a position where the side-contact portion of the silicone resin layer was not desired to be present on the side surface of the PET film. The laminated body was heated for 5 minutes while the position of the hot air blower and the position of the laminated body were maintained so that the surface temperature of the laminated body at the position where the side-contact portion of the silicone resin layer was desired to be present was 90° C. The surface temperature of the laminated body to which the hot air was not applied was 30° C. to 80° C., which was lower than the surface temperature of the laminated body to which the hot air was applied. The laminated body after heating using the hot air was manually stored in a cassette as a storage container.

In Examples 19 to 22, the disposing form of the side-contact portion, the disposing range of the side-contact portion, and the number of corner portions where the side-contact portion is disposed were adjusted as shown in Table 1 described later.

A hot air heater was used as the hot air blower.

Examples 23 to 25

After a rectangular laminated body was produced in the same manner as in Example 1, an infrared heater was applied from a glass plate side of the laminated body to a position where a side-contact portion of a silicone resin layer was desired to be present on a side surface of a PET film, and the laminated body was placed so that the infrared heater was not applied to a position where the side-contact portion of the silicone resin layer was not desired to be present on the side surface of the PET film. The laminated body was heated for 5 minutes while the position of the infrared heater and the position of the laminated body were maintained so that the surface temperature of the laminated body at the position where the side-contact portion of the silicone resin layer was desired to be present was 90° C. The surface temperature of the laminated body to which the infrared heater was not applied was 30° C. to 80° C., which was lower than the surface temperature of the laminated body to which the infrared heater was applied. The laminated body after heating using the hot air was manually stored in a cassette as a storage container.

In Examples 23 to 25, the disposing form of the side-contact portion, the disposing range of the side-contact portion, and the number of corner portions where the side-contact portion is disposed were adjusted as shown in Table 1 described later.

A halogen lamp was used as the infrared heater.

Examples 6, 9, and 13

(Cross-Sectional SEM Observation 2 of Laminated Body)

A laminated substrate in which a glass plate, a silicone resin layer, and a PET film were disposed in this order was cut into small pieces in a range heated at 90° C. for 5 minutes with a hot plate, the cut surface of the laminated substrate was observed with FE-SEM (JSM-7800F Prime manufactured by JEOL Ltd.), and a side surface contact width of the silicone resin layer in the thickness direction of the side surface of the PET film was measured.

The PET films (resin layers) of Examples 1 to 10 and Examples 16 to 25 each have a rectangular shape having four sides including short sides and long sides, and have a size of 912 mm×722 mm.

Example 1 is a configuration in which there is no side-contact portion.

Examples 2, 3, 9, 16, 19, and 23 have a configuration in which the side-contact portion is provided on each of two sides as shown in FIG. 3. In FIG. 3, the side-contact portion 15 is provided over the entire region of each of two sides, but in Examples 2, 3, 9, 16, 19, and 23, a length of the side-contact portion 15 extending from one corner was adjusted so as to have the ratio shown in Table 1.

Example 4 has a configuration in which the side-contact portion is as shown in FIG. 4. Example 5 has a configuration in which the side-contact portion is as shown in FIG. 6. Examples 6, 10, 17, 20, and 24 have a configuration in which the side-contact portion is as shown in FIG. 5. Example 7 has a configuration in which the side-contact portion is as shown in FIG. 9. Examples 8, 18, 22, and 25 have a configuration in which the side-contact portion is provided in all the ranges of the four sides.

The PET films (resin layers) of Examples 11 to 15 have a circular shape and a diameter of 196 mm.

Example 11 has a configuration in which there is no side-contact portion.

Examples 12 to 14 have a configuration in which the side-contact portion is provided continuously in a specific range of the entire circumference. Examples 12 and 13 have a configuration in which the side-contact portion is as shown in FIG. 10. Example 14 has a configuration in which the side-contact portion is as shown in FIG. 11. Example 15 is a configuration in which the side-contact portion is provided on the entire circumference of the outer edge of the PET film (resin layer).

In Table 1, the column of "Thickness of resin layer (μm)" indicates the thickness of the PET film.

In Table 1, the column of "Presence or absence of heating step" indicates the presence or absence of a heat treatment at a temperature equal to or higher than the softening point temperature of the silicone resin layer.

In Table 1, the column of "Disposing form of side-contact portion" indicates how the side-contact portion is disposed with respect to the entire circumference of the outer edge of the PET film. The continuous indicates a state where the side-contact portion is disposed continuously without interruption. The presence of an interval indicates a state where the side-contact portion is disposed to be at least partially broken in the outer edge of the PET film.

In Table 1, the columns of "Disposing range (mm) of side-contact portion" and "Ratio (%) of disposing range of side-contact portion" indicate the total length of the side-contact portion provided on the outer edge of the PET film and the ratio of the length of the side-contact portion provided on the entire circumference of the outer edge of the PET film.

In Table 1, the column of "Number of corner portions where side-contact portion is disposed" indicates the number of side-contact portions disposed at the corner portions of the PET film.

In Table 1, the columns of "Length (mm) of side-contact portion with respect to length of resin layer in thickness direction" and "Ratio (%) of disposing range of side-contact portion" indicate the crawling-up length and the ratio of the side-contact portion with respect to the length of the PET film in the thickness direction.

<Delamination Evaluation>

Ten laminated bodies each including a glass plate, a silicone resin layer (adhesion layer), and a PET film (resin layer) were prepared, and the laminated bodies were manually put into a sheet-fed wafer washer one by one so that an air knife was disposed at an angle of 30 degrees with respect to a perpendicular line orthogonal to a transportation direction of the glass substrate, and the surfaces of the laminated bodies were cleaned with a roll brush (a pushed-in amount by which a tip end of the roll brush was brought into contact with the surface of the PET film), dried with the air knife (compressed air supply pressure: 0.15 MPa), and stored in a cassette. The glass substrate of the laminated body was taken out by hand from the cassette by holding the edge thereof, an outer peripheral portion of the PET film was visually confirmed, and the presence or absence of delamination at the interface between the silicone resin layer and the PET film was evaluated according to the following criteria.

A: Delamination is not visually recognized in all 10 sheets.

B: Delamination is visually recognized in even one of the 10 sheets.

C: Delamination is visually recognized in all 10 sheets.

<Peeling Evaluation of PET Film of Laminated Body>

Ten laminated bodies each including a glass plate, a silicone resin layer (adhesion layer), and a PET film (resin layer) were prepared and placed one by one on a table, and a tape (Mending Tape 810-1-18D, manufactured by 3M Corporation) was attached to a corner of the PET film when the laminated body had a rectangular shape and to an outer peripheral portion of the PET film when the laminated body had a circular shape, and the PET film was peeled off while being pulled at a peel angle of 180 degrees. At this time, peeling at the interface between the silicone resin layer and the PET film was evaluated according to the following criteria.

A: All 10 sheets can be peeled off.
B: Even one of the 10 sheets cannot be peeled off.
C: All 10 sheets cannot be peeled off.

<Comprehensive Evaluation>

Among the delamination evaluation and the peeling evaluation, the bad evaluation was used as the comprehensive evaluation.

TABLE 1

| | Heating type | Member to be disposed at position where side-contact portion is not desired to be present | Shape of laminated body | Thickness of resin layer (μm) | Presence or absence of heating step | Disposing form of side-contact portion | Disposing range (mm) of side-contact portion | Ratio (%) of disposing range of side-contact portion | Number of corner portions where side-contact portion is disposed | Length (mm) of side-contact portion with respect to length of resin layer in thickness direction | Ratio (%) of disposing range of side-contact portion | Delamination evaluation | Peeling evaluation | Comprehensive evaluation |
|---|---|---|---|---|---|---|---|---|---|---|---|---|---|---|
| Ex. 1 | Heating plate | Heat insulating material | Rectangle | 50 | No | No disposing | 0 | 0 | 0 | 0 | 0 | C | A | C |
| Ex. 2 | Heating plate | Heat insulating material | Rectangle | 50 | Yes | Continue | 654 | 20 | 1 | — | — | B | A | B |
| Ex. 3 | Heating plate | Heat insulating material | Rectangle | 50 | Yes | Continue | 980 | 30 | 1 | — | — | A | A | A |
| Ex. 4 | Heating plate | Heat insulating material | Rectangle | 50 | Yes | Continue | 1634 | 50 | 2 | — | — | A | A | A |
| Ex. 5 | Heating plate | Heat insulating material | Rectangle | 50 | Yes | Presence of interval | 2288 | 70 | 2 | — | — | A | A | A |
| Ex. 6 | Heating plate | Heat insulating material | Rectangle | 50 | Yes | Continue | 2614 | 80 | 3 | 32 | 64 | A | A | A |
| Ex. 7 | Heating plate | Heat insulating material | Rectangle | 50 | Yes | Presence of interval | 2614 | 80 | 4 | — | — | A | B | B |
| Ex. 8 | Heating plate | Heat insulating material | Rectangle | 50 | Yes | Continue | 3268 | 100 | 4 | — | — | A | C | C |
| Ex. 9 | Heating plate | Heat insulating material | Rectangle | 25 | Yes | Continue | 654 | 20 | 1 | 21 | 84 | B | B | B |
| Ex. 10 | Heating plate | Heat insulating material | Rectangle | 25 | Yes | Continue | 2614 | 80 | 3 | — | — | A | B | B |
| Ex. 11 | Heating plate | Heat insulating material | Circle | 50 | No | No disposing | 0 | 0 | — | 0 | 0 | C | A | C |
| Ex. 12 | Heating plate | Heat insulating material | Circle | 50 | Yes | Continue | 123 | 20 | — | — | — | B | A | B |
| Ex. 13 | Heating plate | Heat insulating material | Circle | 50 | Yes | Continue | 369 | 60 | — | 32 | 64 | A | A | A |
| Ex. 14 | Heating plate | Heat insulating material | Circle | 50 | Yes | Continue | 492 | 80 | — | — | — | A | A | A |
| Ex. 15 | Heating plate | Heat insulating material | Circle | 50 | Yes | Continue | 615 | 100 | — | — | — | A | C | C |
| Ex. 16 | Heating plate | Cooling member | Rectangle | 50 | Yes | Continue | 654 | 20 | 1 | — | — | B | A | B |
| Ex. 17 | Heating plate | Cooling member | Rectangle | 50 | Yes | Continue | 2614 | 80 | 3 | — | — | A | A | A |
| Ex. 18 | Heating plate | Cooling member | Rectangle | 50 | Yes | Continue | 3268 | 100 | 4 | — | — | A | C | C |

TABLE 1-continued

| | Heating type | Member to be disposed at position where side-contact portion is not desired to be present | Shape of laminated body | Thickness of resin layer (μm) | Presence or absence of heating step | Disposing form of side-contact portion | Disposing range (mm) of side-contact portion | Ratio (%) of disposing range of side-contact portion | Number of corner portions where side-contact portion is disposed | Length (mm) of side-contact portion with respect to length of resin layer in thickness direction | Ratio (%) of disposing range of side-contact portion | Delamination evaluation | Peeling evaluation | Comprehensive evaluation |
|---|---|---|---|---|---|---|---|---|---|---|---|---|---|---|
| Ex. 19 | Hot air blower | — | Rectangle | 50 | Yes | Continue | 654 | 20 | 1 | — | — | B | A | B |
| Ex. 20 | Hot air blower | — | Rectangle | 50 | Yes | Continue | 2614 | 80 | 3 | — | — | A | A | A |
| Ex. 21 | Hot air blower | — | Rectangle | 50 | Yes | Presence of interval | 2614 | 80 | 4 | — | — | A | B | B |
| Ex. 22 | Hot air blower | — | Rectangle | 50 | Yes | Continue | 3268 | 100 | 4 | — | — | A | C | C |
| Ex. 23 | Infrared heater | — | Rectangle | 50 | Yes | Continue | 654 | 20 | 1 | — | — | B | A | B |
| Ex. 24 | Infrared heater | — | Rectangle | 50 | Yes | Continue | 2614 | 80 | 3 | — | — | A | A | A |
| Ex. 25 | Infrared heater | — | Rectangle | 50 | Yes | Continue | 3268 | 100 | 4 | — | — | A | C | C |

As shown in Table 1, the laminated body of the present invention exhibited desired effects.

In the delamination evaluation, from the comparison of Examples 1 and 11 with Examples 2 to 10 and Examples 12 to 25, it was found that delamination was less likely to occur during handling or sheet-fed wafer washing when the silicone resin (side-contact portion) was present on the side surface portion of the PET film from a part of the entire circumference of the outer edge of the PET film (resin layer).

In addition, from the comparison of Examples 2, 9, 12, 16, 19, and 23 with Examples 3 to 8, 10, 13 to 15, 17 to 18, 20 to 22, and 24 to 25, it was found that delamination was less likely to occur in handling or sheet-fed wafer washing when the silicone resin (side-contact portion) was present on the side surface portion of the PET film in a range of 25% or more of the entire circumference of the outer edge of the PET film.

In the peeling evaluation of the PET film, from the comparison of Examples 1 to 7, 9 to 14, Examples 16 to 17, Examples 19 to 21, and Examples 23 to 24 with Examples 8, 15, 18, 22, and 25, it was found that the PET film (resin layer) and the silicone resin layer (adhesion layer) could not be peeled off when the silicone resin (side-contact portion) was present on the side surface portion of the PET film in the entire range of the entire circumference of the outer edge of the PET film (resin layer).

In addition, from the comparison of Examples 1 to 6 and 19 to 20 with Examples 7 and 21, it was found that the PET film (resin layer) was more easily peeled when the silicone resin (side-contact portion) was not present on the side surface portion of the PET film at least one of the corner portions of the PET film (resin layer).

In addition, from the comparison of Examples 6 and 13 with Example 9, it was found that the PET film (resin layer) was more easily peeled off when the silicone resin (side-contact portion) was present in a region of 70% or less of the PET film in the thickness direction on the side surface portion of the PET film.

In Examples 2 to 10 and 12 to 15, the laminated body was heated on the hot plate (heating plate) at a temperature of 90° C. for 5 minutes, and it was confirmed that the same results as at a temperature of 90° C. for 5 minutes were obtained even at a temperature of 100° C. for 5 minutes, a temperature of 110° C. for 5 minutes, and a temperature of 120° C. for 5 minutes.

In Examples 16 to 18, the laminated body was heated on a hot plate (heating plate) at a temperature of 90° C. for 5 minutes, and it was confirmed that the same results as at a temperature of 90° C. for 5 minutes were obtained even at a temperature of 100° C. for 5 minutes, a temperature of 110° C. for 5 minutes, and a temperature of 120° C. for 5 minutes.

In Examples 19 to 22, heating was performed for 5 minutes while maintaining the position of the hot air blower and the position of the laminated body so that the surface temperature of the laminated body was 90° C., and it was confirmed that the same results as at a temperature of 90° C. for 5 minutes were obtained even at a temperature of 90° C. for 7 minutes, at a temperature of 100° C. for 5 minutes, and at a temperature of 100° C. for 7 minutes.

In Examples 23 to 25, heating was performed for 5 minutes while maintaining the position of the infrared heater and the position of the laminated body so that the surface temperature of the laminated body was 90° C., and it was confirmed that the same results as at a temperature of 90° C. for 5 minutes were obtained even at a temperature of 90° C. for 7 minutes, at a temperature of 100° C. for 5 minutes, and at a temperature of 100° C. for 7 minutes.

While the present invention has been described in detail and with reference to specific embodiments thereof, it will be apparent to one skilled in the art that various changes and modifications can be made therein without departing from the spirit and scope thereof.

This application is based on Japanese Patent Application No. 2021-155672 filed on Sep. 24, 2021, the entire subject matter of which is incorporated herein by reference.

REFERENCE SIGNS LIST

10 Laminated Body
12 Glass substrate
12a Surface
12b Side surface
14 Adhesion layer
14a Surface
14b Side surface
15 Side-contact portion
15a Extending portion
15b Crawling-up portion
16 Resin layer
16a Surface
16b Side surface
16d, 16e, 16f, 16g Corner portion
17 Outer edge
19 Arc portion
CL Cutting line
Dt Thickness direction

The invention claimed is:

1. A laminated body comprising a glass substrate, an adhesion layer, and a resin layer in this order,
    wherein the adhesion layer comprises a side-contact portion that is located outside an outer edge of the resin layer in a range of 30% to 70% of an entire circumferential of the outer edge when observing the laminated body from a normal direction of a surface of the glass substrate, the side-contact portion being in contact with at least a part of a side surface of the resin layer.

2. The laminated body according to claim 1,
    wherein the resin layer has a quadrangular shape, and the side-contact portion is provided at a maximum of three corner portions among four corner portions of the resin layer.

3. The laminated body according to claim 1,
    wherein the side-contact portion is in contact with a region of 70% or less of a length of the side surface of the resin layer in a thickness direction.

4. The laminated body according to claim 1,
    wherein the side-contact portion is provided continuously along the outer edge of the resin layer or at an interval along the outer edge of the resin layer.

5. A method for manufacturing the laminated body according to claim 1, the method comprising:
    a step 1 of laminating an adhesion layer-attached resin layer comprising a resin layer and an adhesion layer to a glass substrate so that the adhesion layer and the glass substrate face each other; and
    a step 2 of performing a heat treatment on the laminated substrate obtained in step 1 at a temperature equal to or higher than a softening point of the adhesion layer,
    wherein in the step 2, an outer edge of the resin layer is separated into a region to be heated to a temperature equal to or higher than the softening point of the adhesion layer and a region to be heated to a temperature lower than the softening point of the adhesion layer when observing the laminated substrate from a normal direction of a surface of the glass substrate, and the heat treatment is performed, and the region to be heated to a temperature lower than the softening point of the adhesion layer is in a range of 1% to 75% of an entire circumferential of the outer edge.

6. The method for manufacturing the laminated body according to claim 5, wherein the step 2 comprises a disposing step of disposing the laminated substrate on a heating plate with at least a part of the outer edge of the resin layer protruding from an edge of the heating plate when observing the laminated substrate from the normal direction of the surface of the glass substrate, and after the disposing step, the heat treatment is performed on the laminated substrate by the heating plate at a temperature equal to or higher than the softening point of the adhesion layer.

7. The method for manufacturing the laminated body according to claim 5, wherein in the step 2, the outer edge of the resin layer is separated into a region to be heated to a temperature equal to or higher than the softening point of the adhesion layer and a region to be heated to a temperature lower than the softening point of the adhesion layer when observing the laminated substrate from a normal direction of a surface of the glass substrate, and the heat treatment is performed on the region to be heated to a temperature equal to or higher than the softening point of the adhesion layer by applying hot air or irradiating with light.

* * * * *